United States Patent [19]

Clifford

[11] 4,048,383
[45] Sept. 13, 1977

[54] COMBINATION CELL

[75] Inventor: John E. Clifford, Columbus, Ohio

[73] Assignee: Battelle Memorial Institute, Columbus, Ohio

[21] Appl. No.: 656,659

[22] Filed: Feb. 9, 1976

[51] Int. Cl.² .................... H01M 4/00; H01M 8/18
[52] U.S. Cl. .................................. 429/19; 429/40; 429/44; 204/129
[58] Field of Search ................... 136/86 DD, 86 R; 429/17, 19, 40, 44; 204/129, DIG. 3, DIG. 4

[56] References Cited

U.S. PATENT DOCUMENTS

| | | | |
|---|---|---|---|
| 3,306,774 | 2/1967 | Dengler | 136/86 R |
| 3,337,369 | 8/1967 | Frazier | 136/86 DD |
| 3,375,140 | 3/1968 | Oswin | 136/86 DD |
| 3,416,966 | 12/1968 | Oswin | 136/86 DD |
| 3,507,704 | 4/1970 | Webb | 136/86 R |
| 3,839,091 | 10/1974 | Bloomfield | 136/86 R |

Primary Examiner—John H. Mack
Assistant Examiner—H. A. Feeley
Attorney, Agent, or Firm—Philip M. Dunson

[57] ABSTRACT

A combination water electrolyzer and fuel cell for selectively storing and supplying energy while in a substantially fixed position, typically comprising a pan held in a substantially horizontal position, an aqueous alkaline electrolyte (e.g., NaOH) held within the pan at elevated temperature, means communicating with a supply of hydrogen and forming a container for the hydrogen within the pan, a thin nonporous corrosion resistant hydrogen diffusion negative electrode (e.g., PdAg) having a porous support positioned within the pan and having one surface on contact with the electrolyte and an opposite surface communicating with the hydrogen, means communicating with a supply of oxygen and furnishing the oxygen to a region contiguous with the exposed surface of the electrolyte, a thin porous corrosion resistant positive electrode (e.g., Pt or alloy thereof) in contact with the electrolyte and having a thin substantially flat major portion yieldably supported to float adjacent and substantially parallel to the upper surface of the electrolyte with a substantial portion of the surface of the positive electrode contacted by electrolyte and adjacent an interface of the electrolyte and the oxygen, and means for connecting the electrodes selectively either to a source of direct current for charging the cell or to an electric load circuit for using the energy stored in the cell when charged.

Typically included are an insulating member fitting onto the upper portion of the cell and shaped to hold another such cell; at least one additional such cell, each held by the insulating member of the cell beneath it; means for storing in a first confined region the supply of hydrogen, including that produced during charging; and means for storing in a second confined region the supply of oxygen, including that produced during charging, with the partial pressure of the oxygen at least about 5 psia.

31 Claims, 4 Drawing Figures

U.S. Patent    Sept. 13, 1977    4,048,383
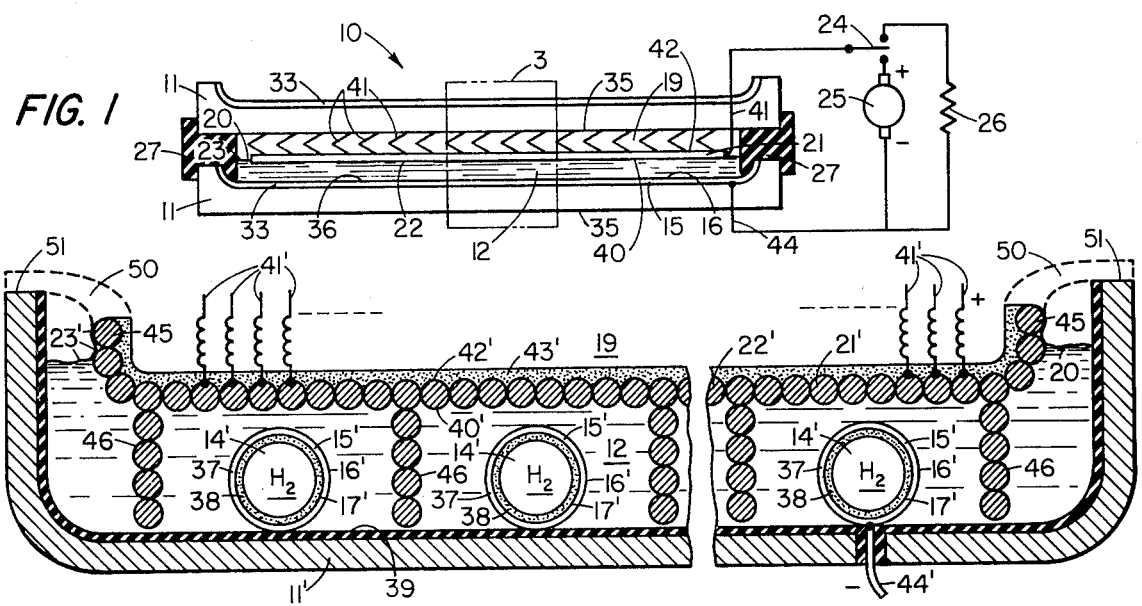
FIG. 1
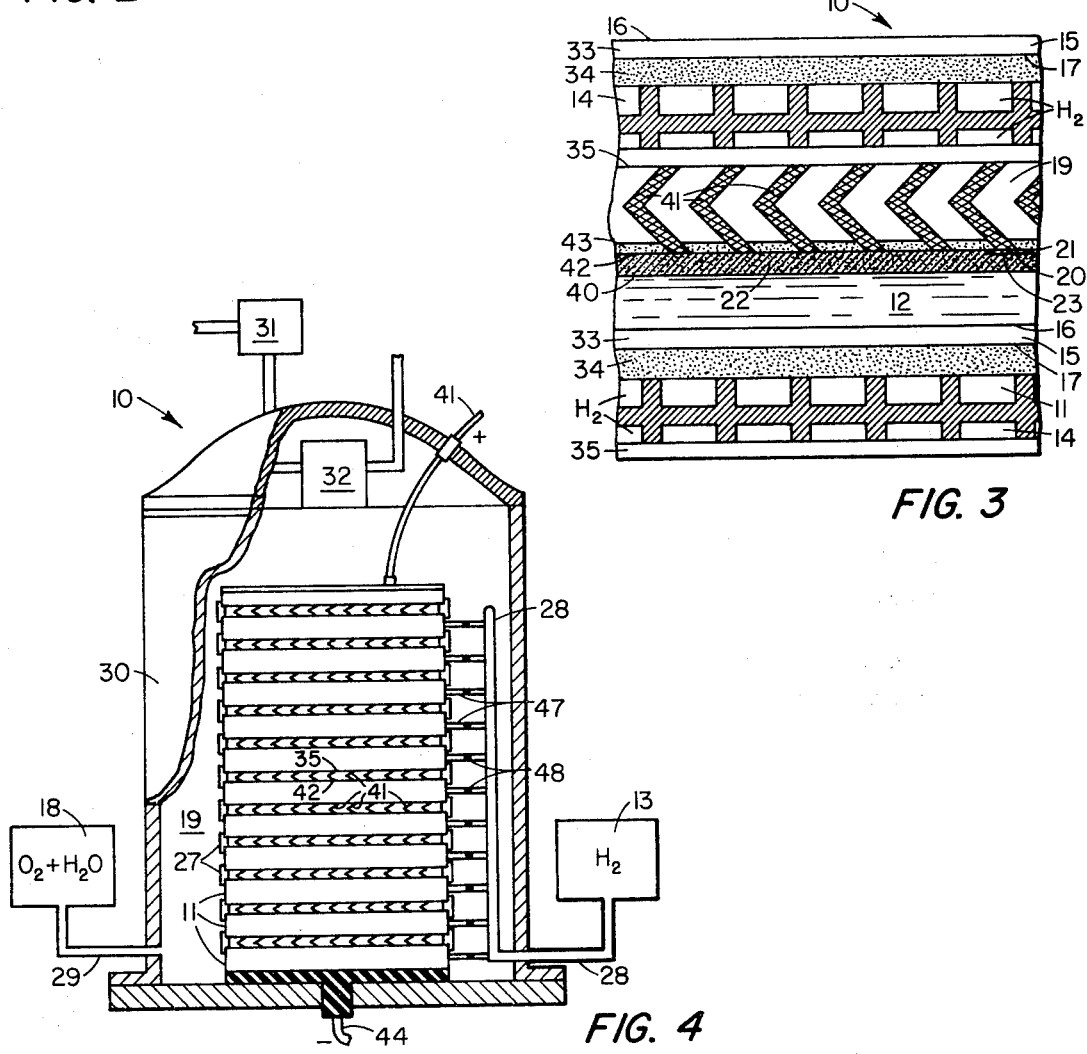
FIG. 2
FIG. 3
FIG. 4

COMBINATION CELL

BACKGROUND

Utility system electric loads vary from hour to hour, day to day, and from season to season. These load variations result in typical annual electric utility system load factors ranging from about 50 to 70 percent. Utility system generating capacity is installed to meet the system's annual peak daily load requirements with a certain degree of reliability. Therefore, the amount of total installed generating capacity is generally in the range of 15 to 25 percent higher than the system's peak day load demand. Because of the difference between the variations in the system load profile and the generation capacity reserve margin at any time, a portion of a system's baseload installed generating capacity may be unused during off-peak or light load periods. This availability of off-peak base-load generating capacity makes electric energy storage concepts attractive to utilities because of the potential savings which could result from storing low cost base-load off-peak energy for use in supplying peak load requirements. The benefits of electrochemical energy storage devices are expected to be realized more fully in conjunction with nuclear power plants which are designed as base load plants for optimal economy of operation rather than with base-load fossil fuel plants whose fuel supply is limited, unstable and increasing in cost as lower sulfur content fuel is needed to meet air pollution control requirements.

Off-peak energy storage requirements have been met in the past by the use of hydroelectric pumped water storage on electric utility systems. Lack of acceptable sites for future pumped storage systems has increased the desirability of developing alternative off-peak energy storage systems. Electrochemical energy storage systems are potentially attractive for future use in electric utility systems. The two general types of electrochemical systems being considered are: rechargeable chemical batteries (e.g., lithium sulfur and lead-acid batteries) and hydrogen systems. One type of hydrogen system is based on a water electrolysis subsystem to generate hydrogen, a metal hydride subsystem to store hydrogen, and a hydrogen/air (oxygen) fuel cell subsystem. The electrolyzer/fuel cell combination (two separate devices) with hydrogen, and possibly oxygen, storage constitutes an off-peak energy storage system. This use of a fuel cell is distinguished from a reformed-type fuel cell operating on fossil fuels as a source of hydrogen to generate peaking power.

The water battery or reversible electrolyzer of the present invention is distinguished from the above hydrogen system in that the same hardware or device is used to perform both the water electrolysis and the fuel cell functions within a closed system recycling the water and gases between the device and their storage facilities. The general concept of using a single device for off-peak energy storage is not new. The term "regenerative (hydrogen-oxygen) fuel cell" has been used to describe several different concepts that were variations of fuel cell technology for space applications: a single electrolyzer/fuel cell device with internal gas storage, separate electrolyzer and fuel cell devices in a common unit with internal gas storage, separate water electrolysis and fuel cell subsystems with external gas storage.

The water battery is a name we are using for a water electrolyzer capable of being operated in the reverse (fuel cell) mode to generate electrical energy. The name distinguishes this reversible water electrolyzer concept from other water electrolysis, fuel cell, or regenerative fuel cell concepts being considered by others as an energy storage system.

Large-scale water electrolysis units that have been developed over the past 50 years for use in industry (primarily foreign countries rather than the U.S.) are not capable of being operated in the reverse or fuel-cell mode. Present industrial electrolyzers designed for low temperature operation (less than 100 C) for long life are relatively inefficient. If used in conjunction with advanced fuel cells, the round-trip efficiency for an energy storage system would be significantly less than 50 percent. In addition, a separate water electrolysis unit and a separate fuel cell would occupy about twice the space and involve nearly twice the capital investment. Each unit would be idle a significant portion of the daily cycle in an energy storage system using off-peak energy.

Regenerative hydrogen-oxygen fuel cells as the name implies were outgrowths of fuel-cell development that were subsequently investigated for conventional battery applications such as for use in outer space. However, use of electrodes designed for fuel-cell operation as electrodes for water electrolysis severely limits the electrode life or the efficiency attainable if used at low temperatures. In contrast to regenerative fuel-cells, the term reversible water electrolyzer is meant to imply a system designed for water electrolysis with long life and high efficiency that is also capable of being operated in the reverse mode as a hydrogen-oxygen fuel cell.

Rechargeable chemical batteries are distinguished from fuel cell systems because the active materials are retained within a closed system rather than being supplied continuously from an external source. It is common practice to name the battery system for the active materials or reactants, e.g., Ni-Cd (nickelic hydrated oxide-cadmium), Ag—Zn (argentic oxide-zinc) batteries. The elemental name of the chemical battery reflects the active materials which are usually economic considerations (cost, availability) of concern for large energy storage capacity. The active materials in a reversible water electrolyzer are water, hydrogen, and oxygen.

There are alternative modes of storing the active materials in the charged water battery (e.g., hydrogen as a gas or as a metal hydride). However, in the discharged battery, the active material will be stored as liquid water. Thus, the term water battery is appropriate.

In contrast to an energy storage system based on separate water electrolyzers and $H_2/O_2$ fuel cells, the water battery operates similarly to chemical batteries in that the same electrodes are used for both charge and discharge. A water battery, or reversible electrolyzer, will operate alternately in both the charging and discharging modes. During charging, electric energy is used to electrolyze water, and the oxygen and hydrogen gases generated are stored externally to the cells. During discharging the stored hydrogen and oxygen are reacted together electrochemically to provide electrical energy and the water produced is stored externally to the cells. Both the positive and the negative electrodes must be capable of reverse operation. Of the two modes of operation, the charging mode is more demanding of materials requirements because of the oxidizing conditions at the oxygen electrode.

The electrolysis cell which is the basis of the water battery concept was developed over a period of several years at Battelle's Columbus Laboratories. The cell is characterized as a long-life water electrolysis cell for operation in the intermediate temperature range (150° C to 250° C) at high efficiency. Laboratory water electrolysis cell units have been operated at over 200° C and various current density levels for extended periods of time (up to 120 days) and have shown stable voltage behavior (no performance deterioration with time). Electrodes have been operated in the water electrolysis mode at 145° C for over 16,000 hours with no performance deterioration.

SUMMARY

A typical combination water electrolyzer and fuel cell according to the present invention for selectively storing and supplying energy while in a substantially fixed position comprises a pan held in a substantially horizontal position, an aqueous electrolyte held within the pan, means communicating with a supply of hydrogen and forming a container for the hydrogen within the pan, a nonporous hydrogen diffusion negative electrode positioned within the pan and having one surface in contact with the electrolyte and an opposite surface communicating with the hydrogen, means communicating with a supply of oxygen and furnishing the oxygen to a region contiguous with the exposed surface of the electrolyte, a porous positive electrode in contact with the electrolyte and having a thin substantially flat major portion adjacent and substantially parallel to the upper surface of the electrolyte with a substantial portion of the surface of the positive electrode contacted by electrolyte and adjacent an interface of the electrolyte and the oxygen, and means for connecting the electrodes selectively either to a source of direct current for charging the cell or to an electric load circuit for using the energy stored in the cell when charged.

A typical cell comprises also an insulating member fitting onto the upper portion of the cell and shaped to hold another such cell, and at least one additional such cell, each held by the insulating member of the cell beneath it. Also typically included are means for storing in a first confined region the supply of hydrogen, including that produced during charging, and means for storing in a second confined region the supply of oxygen, including that produced during charging; means for maintaining the partial pressure of the oxygen in the second confined region at about 5 to 3000 psia; and means for maintaining the temperature of the electrolyte at least at about 100° C.

The negative electrode typically comprises a thin member on a porous support held in a substantially horizontal position to form, with the bottom portion of the pan, the container for the hydrogen within the pan, and with the upper surface of the thin member supporting the electrolyte. Another typical form of the negative electrode comprises a thin tube immersed in the electrolyte and with the inside of the tube comprising the means communicating with the supply of hydrogen and forming the container for the hydrogen within the pan. Typically the tube comprises a thin conductive outer layer on a porous tubular support, and the pan has an insulating inner surface that supports the tube. The surface of the negative electrode in contact with the electrolyte typically comprises a corrosion resistant alloy consisting essentially of a major amount of palladium and a minor amount of silver, typically about 10 to 45 percent by weight of silver and the balance palladium. The negative electrode typically comprises a conductive layer about 0.2 to 80 micrometers thick in contact with the electrolyte on a porous support in contact with the hydrogen.

The distance between the adjacent surfaces of the positive and negative electrodes typically is about 0.2 to 30 millimeters. A typical electrolyte comprises an alkaline solution, typically about 35 to 85 percent sodium hydroxide.

A typical positive electrode comprises a corrosion resistant material such as platinum or an alloy thereof with the ratio of surface area to weight of the active surface material about 0.02 to 0.5 square meter per gram. Typically useful alloys include platinum and rhodium. The positive electrode typically comprises a thin member yieldably supported to permit it to float on the electrolyte with the pores of the electrode at least partly below the upper surface of the electrolyte. Typically at least part of the yieldable support is provided by springs or other flexible members, or by the buoyancy of the electrolyte, or by both. The positive electrode typically comprises a thin porous conductive member having on its upper surface a thin porous substantially hydrophobic and nonconductive coating typically comprising a layer about 0.1 to 400 micrometers thick comprising essentially polytetrafluoroethylene (PTFE) The major portion of the positive electrode typically is about 0.5 to 100 micrometers thick, and the average distance between the substantial portion of the surface contacted by electrolyte and the interface of the electrolyte and the oxygen typically is about 0.2 to 50 micrometers.

The connecting means typically include a plurality of flexible connectors to the positive electrode. Where at least one additional such cell is included, each typically is held by the insulating member of the cell beneath it, with a plurality of flexible conductive members connecting respective regions on the lower surface of the negative electrode in each additional cell to the regions directly beneath them on the adjacent upper surface of the positive electrode of the cell beneath it. The cell may include a thin flexible portion extending outward from the major portion of the positive electrode and connected to the pan above the upper surface of the electrolyte.

The positive electrode may include an upwardly extending rim along its perimeter. The cell may comprise means for limiting the vertical movement of the positive electrode. Typically the positive electrode includes a downwardly extending portion shaped to stop any downward movement at a position where the substantially flat lower surface is closely spaced from the nearest surface of the negative electrode, and the downwardly extending portion typically includes capillary means for maintaining electrical contact between the electrolyte and the major portion of the positive electrode should the level of the upper surface of the electrolyte fall below the position of the major portion of the positive electrode.

DRAWINGS

FIG. 1 is a front sectional view, largely schematic, of a typical combination cell according to the present invention.

FIG. 2 is a similar view of alternative forms of some of the components and arrangements in FIG. 1.

FIG. 3 is an enlargement of the portion labelled 3 in the cell of FIG. 1.

FIG. 4 is a front sectional view, largely schematic, of a typical combination cell comprising several cells as in FIG. 1 or 2.

PREFERRED EMBODIMENTS

A typical combination water electrolyzer and fuel cell 10 according to the present invention for selectively storing and supplying energy while in a substantially fixed position comprises a pan 11, 11' held in a substantially horizontal position, an aqueous electrolyte 12 held within the pan, means communicating with a supply of hydrogen 13 and forming a container 14, 14' for the hydrogen within the pan 11, a nonporous hydrogen diffusion negative electrode 15, 15' positioned within the pan 11 and having one surface 16, 16' in contact with the electrolyte 12 and an opposite surface 17, 17' communicating with the hydrogen, means communicating with a supply of oxygen 18 and furnishing the oxygen to a region 19 contiguous with the exposed surface 20 of the electrolyte 12, a porous positive electrode 21, 21' in contact with the electrolyte 12 and having a thin substantially flat major portion 22, 22' adjacent and substantially parallel to the upper surface 20 of the electrolyte 12 with a substantial portion of the surface 40, 42; 40', 42' of the positive electrode 21 contacted by electrolyte 12 and adjacent an interface 23, 23' of the electrolyte 12 and the oxygen, and means 41, 41', 44, 44' (with a switch 24) for connecting the electrodes 15, 21; 15', 21' selectively either to a source of direct current 25 for charging the cell 10 or to an electric load circuit 26 for using the energy stored in the cell 10 when charged.

A typical cell 10 comprises also an insulating member 27 fitting onto the upper portion of the cell 10 and shaped to hold another such cell, and at least one additional such cell 10, each held by the insulating member 27 of the cell beneath it. Also typically included are means 13 (with connecting means 28 thereto) for storing in a first confined region 14, 14' the supply of hydrogen, including that produced during charging, and means 18 (with connecting means 29 and a housing 30) for storing in a second confined region 19 the supply of oxygen, including that produced during charging; means 18 (may include conventional manual or automatic pressure controls) for maintaining the partial pressure of the oxygen in the second confined region 19 at about 5 to 3000 psia; and means, such as a fan 31 and a heat exchanger 32 (may include conventional manual or automatic temperature controls), for maintaining the temperature of the electrolyte at least at about 100° C.

As shown in FIGS. 1 and 3, the negative electrode 15 typically comprises a thin member 33 on a porous support 34 held in a substantially horizontal position to form, with the bottom portion 35 of the pan 11, the container 14 for the hydrogen within the pan 11, and with the upper surface 16 of the thin member 33 supporting the electrolyte 12. Another typical form of the negative electrode, as shown in FIG. 2, comprises a thin tube 15' immersed in the electrolyte 12 and with the inside of the tube 15' comprising the means communicating (via the connecting means 28) with the supply of hydrogen 13 and forming the container 14' for the hydrogen within the pan 11. Typically the tube 15' comprises a thin conductive outer layer 37 on a porous tubular support 38, and the pan 11 has an insulating inner surface 39 that supports the tube 15'. The surface 16, 16' of the negative electrode 15, 15' in contact with the electrolyte 12 typically comprises a corrosion resistant alloy consisting essentially of a major amount of palladium and a minor amount of silver, typically about 10 to 45 percent by weight of silver and the balance palladium. Other corrosion resistant, electrically conductive materials, such as iron, nickel, and their alloys, also may be used. The negative electrode 15, 15' typically comprises a conductive layer 33, 37 about 0.2 to 80 micrometers thick in contact with the electrolyte 12 on a porous support 34, 38 in contact with the hydrogen.

The distance between the adjacent surfaces 40, 40'; 16, 16' of the positive 21, 21' and negative 15, 15' electrodes typically is about 0.2 to 30 millimeters. A typical electrolyte 12 comprises an alkaline solution, typically about 35 to 85 percent sodium hydroxide.

A typical positive electrode 21, 21' comprises a corrosion resistant material such as platinum or an alloy thereof with the ratio of surface area to weight of the active surface material about 0.02 to 0.5 square meter per gram. Alloys including platinum and rhodium have been found to be especially useful. Other equivalent materials that are electrically conductive and resistant to corrosion may also be used, such as alloys of irridium, palladium, or other precious metals. The positive electrode 21, 21' typically comprises a thin member 22, 22' yieldably supported to permit it to float on the electrolyte 12 with the pores of the electrode 21, 21' at least partly below the upper surface 20 of the electrolyte 12. Typically at least part of the yieldable support is provided by springs or other flexible members, 41, 41' or by the buoyancy of the electrolyte 12, or by both. The positive electrode 21, 21' typically comprises a thin porous conductive member 22, 22' having on its upper surface 42, 42' a thin porous substantially hydrophobic and nonconductive coating 43, 43' typically comprising a layer about 0.1 to 400 micrometers thick comprising essentially polytetrafluoroethylene. The major portion 22, 22' of the positive electrode 21, 21' typically is about 0.5 to 100 micrometers thick, and the average distance between the substantial portion of the surface 40, 42; 40', 42' contacted by electrolyte 12 and the interface 23, 23' of the electrolyte 12 and the oxygen typically is about 0.2 to 50 micrometers.

The connecting means typically include a plurality of flexible connectors 41, 41' to the positive electrode 21, 21'. Where at least one additional such cell 10 is included, each typically is held by the insulating member 27 of the cell 10 beneath it, with a plurality of flexible conductive members 41 connecting respective regions on the lower surface 35 of the negative electrode 15 in each additional cell to the regions directly beneath them on the adjacent upper surface 42 of the positive electrode 21 of the cell 10 beneath it. (FIG. 4).

The cell 10 may include a thin flexible portion 50, as indicated by dashed lines in FIG. 2, extending outward from the major portion 22, 22' of the positive electrode 21, 21' and connected to the pan 11, 11' above the upper surface 20 of the electrolyte 12, as indicated at 51 in FIG. 2, by glue or other suitable adhesive or fastening means. The outwardly extending portion 50 typically comprises either a continuation of the positive electrode 21, 21' itself, microporous PTFE, or other thin flexible membranous material, forming a covering to confine the electrolyte 12 within the cell 10.

The positive electrode 21' may include an upwardly extending rim 45 along its perimeter, forming a "boat", especially where the extending portion 50 is not included. The cell 10 may comprise means (such as spacers or other obstructions) for limiting the vertical movement of the positive electrode 21, 21'. Typically the positive 21' electrode includes a downwardly extending portion 46 shaped to stop any downward movement at a position where the substantially flat lower surface 40' is closely spaced from the nearest surface 16' of the negative electrode 15', and the downwardly extending portion 46 typically includes capillary means for maintaining electrical contact between the electrolyte 12 and the major portion 22' of the positive electrode 21' should the level of the upper surface 20 of the electrolyte 12 fall below the position of the major portion 22' of the positive electrode 21'.

A substation water battery unit with an output power on the order of 10 MW would consist of several water battery modules of about 0.5 to 0.8 MW each depending on the nominal design efficiency. A water battery module consists of a collection of reversible electrolysis cells connected together in a vertical stack and sealed in a gas tight steel container. FIG. 4 is a schematic of a typical water battery module. The estimated size of the module is about 8 feet high and about 5.5 feet in diameter. The height of the cell stack within the battery unit container is estimated to be about 5.5 feet.

Various pieces of ancillary equipment include a fan 31 to draw in room air for cooling, and a heat exchanger 32 to maintain the temperature inside the unit at an acceptable level. The heat exchanger 32 inside the module 10 could also contain a fan to provide oxygen recirculation if needed to supplement natural convection. The fan/heat exchanger can be used to preheat the oxygen during start up of each unit.

Typical features of an individual electrolyzer cell 10 based on present materials technology are a hydrogen diffusion electrode 15, 15' with a solid, nonporous, metal layer 16, 16' (e.g., Pd-25Ag alloy) in contact with the electrolyte 12 and hydrogen; a porous positive electrode 21, 21' (e.g., platinum) in contact with the electrolyte 12 and oxygen gas, a bipolar cell construction as shown in FIGS. 1, 3, and 4, and operation at temperatures higher than 100° C using a concentrated aqueous caustic electrolyte 12 (e.g., 80 weight percent NaOH for operation at atmospheric pressure). FIGS. 1 and 3 show details of one version of the cell construction. The drawings are not to scale in order to illustrate the elements of cell design. The geometric active electrode area of each cell is typically about 10 square feet.

The hydrogen-diffusion electrode 15 in FIGS. 1, 3, and 4 is horizontal and operates with 100 percent transmission of hydrogen during electrolysis. This electrode designed in the shape of a shallow disk becomes the container for the liquid electrolyte and the need for sealing of the electrolyte is eliminated. The only metals in contact with the electrolyte are the hydrogen-diffusion negative electrode 15 and the platinum positive electrode 21.

The hydrogen-diffusion electrode member 33 is supported on a porous metal sheet 34 which allows hydrogen to pass freely through and also allows lateral expansion movement of the electrode while maintaining electrical contact. The porous metal 34 under the diffusion member 33 is supported by the principal load-bearing ribbed structure at 14 which provides channels for hydrogen collection and which in turn is bonded to a solid metal sheet 35 (hydrogen impermeable) forming the opposite side of the cathode chamber 14. The metal sheet 35 provides electrical connection through flexible intercell connectors 41 to the positive electrode 21 of the cell 10 below it in a bipolar series stack. The complete structure acts as a bipolar electrode in allowing electronic conduction to the next cell 10 and collection of hydrogen in a sealed metal structure. As shown in FIG. 4, a hydrogen delivery tube 47 at one side of the bipolar structure conducts hydrogen to the header tube 28. The hydrogen delivery tube 47 contains a nonconducting section 48 to provide electronic insulation between each cell 10 and the common metal hydrogen header 28.

Each bipolar electrode containing the negative electrode 15 of one cell and the positive electrode 21 of the cell below it is an integral structure that acn be stacked vertically. The structure plus the electrolyte constitutes a unit cell as shown in FIG. 1. A cell insulator 27 is provided on two sides as shown in FIG. 1 to insulate each cell 10 and also to serve as a spacer. Polytetrafluoroethylene is the presently preferred insulating material that allows satisfactory cell life, but its use limits the operational temperature to 250° C.

The cell insulator and spacer 27 is not a gas seal. There is no need for tight sealing between cells to prevent oxygen leakage since the entire cell stack is in a housing containing oxygen. Thus, cells can be stacked vertically with a minimum of support in contrast to the heavy end plates and tie bolts of conventional series connected cells. There is no electrolyte path between adjacent cells, so parasitic currents are absent allowing 100 percent current efficiency to be obtained with a series bipolar connected cell stack. The reactant feed in the water electrolysis mode is water vapor (steam at the cell operating temperature). The recirculated oxygen-water vapor mixture provides reactant feed water to the electrolyte and removes product oxygen at the positive electrode of each cell for electrolysis. Conversely, in the fuel cell mode, the recirculating gas mixture provides reactant feed oxygen and removes product water as steam at the positive electrode of each cell.

The baseline water battery unit has an output of 10 MW dc at a voltage of 1000 volts. The nominal design module efficiency of 50 percent was selected by consideration of the lowest water battery system cost consistent with electrochemical performance likely to be attainable in the near term (i.e., about 1980). For a daily cycle of 12 hours discharge and 8 hours charge, the charge current density is 1.5 times the discharge current density. The baseline performance projected for the near term indicates that for 50 percent module efficiency, discharge will be at 304 amp/ft$^2$ and 0.76 volt per cell and charge will be at 456 amp/ft$^2$ and 1.52 volt per cell. The total cell area required for 50 percent efficiency is 43,200 ft$^2$.

The 10 MW baseline water battery system designed for 50 percent efficiency consists of 18 modules, with each module containing 219 cells and each cell having an area of about 11 ft$^2$. To obtain the same terminal voltage (1000 volts) in both the charging and discharging modes, these modules are connected in various series and parallel groups. In the charging mode, 6 module groups are connected in parallel with each group consisting of 3 modules which in turn are connected in series. In the discharging mode, 3 module groups are connected in parallel, each group being formed by connecting 6 modules in series. For a 50 percent efficiency design, 8 modules (groups of 4 and 2) could be used and would result in more cells per stack (taller module) and greater MW capacity per module. For a 75 percent efficiency design, 12 modules (groups of 4 and 3) would be selected.

A novel feature of the reversible electrolyzer is the use of a floating oxygen electrode in a free-electrolyte cell (no matrix between the electrodes). This design is possible since the negative electrode is a hydrogen diffusion electrode which allows 100 percent transmission of hydrogen formed during the electrolysis mode of operation. The combination of features provides a unique design that avoids many of the problems of conventional electrolyzers and also allows the use of a porous positive electrode for reverse operation in the fuel-cell mode.

For an efficient electrolyzer, it is necessary to minimize the ohmic resistance in the passage of current between the electrodes. The resistance depends on the specific conductance of the electrolyte and the distance between the electrodes. Additional resistance is added if a separator or matrix is used between the electrodes and if the gases generated during electrolysis occupy the space between the electrodes.

Historically, most industrial water electrolyzers have had electrodes oriented in a vertical direction to aid in gas removal. Hydrogen and oxygen gas bubbles generated at the electrodes rise through the electrolyte because of buoyancy and the hydrostatic pressure of the electrolyte column in the earth's gravity field. However, the gas bubbles rising between the electrodes effectively hinder the current passage through the electrolyte and increase the resistance of the electrolyte. The resistance is greatest at the top of the cell because of the accumulation of gas and the resistance depends on the height of the electrodes and the space between the electrodes. The net effect is that reducing the space between the electrodes does not reduce the resistance when the space for gas bubbles becomes too small. Additionally, a porous diaphragm is needed between the electrodes to prevent intermixing of hydrogen and oxygen gas bubbles in the electrolyte. The diaphragm further restricts the passage of current and increases the ohmic resistance.

The use of a hydrogen diffusion electrode as the negative electrode eliminates part of the problem because no hydrogen gas bubbles are formed in the electrolyte. Hydrogen gas accounts for $\frac{2}{3}$ of the gas formed in water electrolysis. Thus, the added resistance of hydrogen gas bubbles is eliminated and the space between the electrodes can be reduced. However, if the electrodes are vertical, there is still a need for the diaphragm to prevent the oxygen bubbles from reaching the negative electrode.

By orienting the electrodes in a horizontal direction (rather than a vertical direction) as in the present invention with the negative hydrogen diffusion electrode at the bottom of the cell and the porous oxygen positive electrode at the top of the cell, the need for a diaphragm is eliminated. There are no hydrogen bubbles formed in the electrolyte at the negative electrode. Thus, there is no need for a diaphragm to prevent hydrogen bubbles from rising because of buoyancy towards the oxygen electrode. Likewise, with the oxygen electrode oriented horizontally above the hydrogen electrode, there is no need for a diaphragm, since oxygen bubbles formed at the positive electrolyte tend to rise vertically by buoyancy away from the negative electrode. The positive electrode is made porous so that the oxygen can readily escape from the electrolyte. Since the oxygen electrode is close to the oxygen electrolyte interface any oxygen bubbles formed in electrolysis have very little distance to travel. Thus, the oxygen gas bubble accumulation in the electrolyte is minimized and the resistance to current passage between the electrodes is minimal and practically equal to the resistance of gas-free electrolyte. The electrodes can be spaced very close together for minimum distance of electrolytic conduction with no added resistance because of a diaphragm or accumulation of gas bubbles in the electrolyte space between the electrodes.

With the oxygen electrode floating near the oxygen/electrolyte interface, the distance that the generated oxygen travels before release to the gas phase is minimized. With the electrode floating near the electrolyte surface, the distance of oxygen travel is always minimal regardless of changes in electrolyte volume by dilution or concentration and changes in the interelectrode spacing. The horizontal floating electrode with a hydrophobic layer on the gas phase side utilizes the buoyancy of the electrolyte created by gravity in a new and unique manner with benefits in reduced cell ohmic resistance for electrolysis. Elimination of a diaphragm between the electrodes in addition to minimizing ohmic resistance is advantageous in allowing operation of electrolysis cells at optimal high temperatures. For example, most industrial electrolysis cells that utilize a diaphragm (typically asbestos) to keep the gases separated are restricted to operation at low temperatures (less than 100° C and usually about 60° C) in order to have long operating life and low maintenance. The unavailability of low-cost diaphragm materials of suitable properties that would be resistant to caustic solutions at high temperature has restricted the design of high temperature electrolysis cells. Thus, it has not been possible in the past to take advantage in industrial electrolyzer design of the reduced electrode overvoltage and reduced electrolyte resistance that is possible at elevated temperature in the range of 100° C to 250° C. While metal electrodes can be conceived that would be sufficiently corrosion resistant for high temperature cells, they have not been used because of the need for a diaphragm and the limitations of diagram materials. Thus, the electrolysis cell of the present invention by eliminating the need for a diaphragm opens up a new operating area of high temperature aqueous water electrolysis with reduced overvoltage leading to high electrical efficiency designs.

Past efforts to design a water electrolysis cell without a diaphragm or separator between the electrodes have been notably unsuccessful as reported in the literature. The most notable example, is the Bacon cell which was successfully developed as a fuel cell but which was unsatisfactory as a water electrolysis cell. The Bacon cell with biporous metal electrodes is a free-electrolyte fuel cell that utilizes two-layer, porous metal electrodes with the fine-pore layer on the electrolyte side and the larger pore layer on the gas phase side and a positive differential pressure between the gas and electrolyte to expel electrolyte from the large pores. While satisfactory for $H_2/O_2$ fuel-cell performance, reverse operation as a water electrolysis cell is unsatisfactory because some of the hydrogen and oxygen gases are evolved on the electrolyte side of the fine metal pore layer and there is no practical way to remove the hydrogen and oxygen from the electrolyte or prevent intermixing of the gases in the electrolyte. Horizontal orientation of the Bacon-type cell would not completely solve the problem for water electrolysis because while gas might escape from the uppermost horizontal electrode, the gas evolved on the electrolyte side of the fine-pore layer of the lower electrode would rise by buoyance toward the upper electrode and the intermixing of hydrogen and oxygen would create an explosive mixture. Bacon has suggested that his cell could be used as a water electrolyzer if the fine-pore layer on the electrolyte side were an inert porous material, either passivated metal or nonconductive material so that the hydrogen and oxygen gases are generated in the large-pore layer. While this is a partial solution, the net effect is that a separator (diaphragm) has been added to the electrolyte side of each electrode to prevent intermixing of gases and guarantee gas evolution on the correct side of the electrode. With the modification of the Bacon biporous electrode in order to accomplish electrolysis, there is no advantage of having a free-electrolyte in the intervening space and the interelectrode space should be reduced to a minimum. In effect, the fine-pore layer of each electrode can be the same porous inert material and this type of cell design is commonly referred to as a matrix cell. The matrix in these cells serves to hold the electrolyte by capillary action because of smaller pore size relative to the metallic electrodes. The matrix with small pores also serves to prevent intermixing of the hydrogen and oxygen gases and thus is functionally similar to the diaphragm of free-electrolyte industrial electrolyzers. The matrix cell and the diaphragm cell have similar limitations in that the addition of a porous inert gas separator in the electrolyte between the electrodes increases the ohmic resistance. Similarly, the absence of suitable materials for use as either a diaphragm or matrix limits the practical operating temperature of cells and thus the efficiency possible at high power density. Extensive efforts have been made to develop suitable matrix materials that would allow long operational life at high temperature in caustic electrolyte. Diamond powder is wettable by electrolyte and has the chemical resistance for extended use at temperatures of 200° C to 250° C in concentration caustic electrolyte. However, it is difficult to fabricate as a matrix and would be exorbitantly expensive for industrial application while adding ohmic resistance. The optimum solution to the problem of designing an efficient electrolyzer is to eliminate the need for a matrix or diaphragm as in the present invention.

The present invention capitalizes on the unique property of hydrogen diffusion electrodes to accomplish a separation of hydrogen gas from oxygen gas during water electrolysis. The function of hydrogen/oxygen gas separation that in the past has required a diaphragm, separator, or matrix between the electrodes is accomplished by the satisfactory operation of hydrogen diffusion electrodes which by their nature insure that the hydrogen gas is formed in the hydrogen cavity. Thus, the hydrogen gas generated is always separated from the electrolyte and oxygen by the solid metallic hydrogen diffusion electrode itself.

The exact mechanism by which solid hydrogen diffusion cathodes function in the water electrolysis mode is not known. However, when operating satisfactorily, no hydrogen gas bubbles are formed on the electrolyte side of the electrode and practically all of the hydrogen is evolved as a gas on the gas-phase side of the foil. It is believed that the surface tension of the electrolyte is a factor that prevents evolution of gas bubbles on the electrolyte side and allows the concentration of hydrogen in the metal surface near the electrolyte to increase sufficiently so that hydrogen diffusion occurs toward the surface in contact with gas.

While no visible hydrogen gas bubbles are formed on the surface of the negative electrode, hydrogen does dissolve in the electrolyte because of the finite solubility of hydrogen in the electrolyte. Thus, the electrolyte adjacent to the negative surface is probably saturated with hydrogen. Thus, there is a concentration gradient from the negative electrode surface toward the opposing positive electrode and diffusion of hydrogen towards the opposing electrode occurs. However, in concentrated caustic electrolyte the hydrogen solubility and diffusivity are relatively small even at high temperature. Thus, the diffusion rate of hydrogen through a significant electrolyte thickness is relatively small in comparison to the diffusion of hydrogen through the metal foil electrode which is orders of magnitude thinner than the electrolyte. Thus, the majority of hydrogen diffuses through the metal electrode. Experiments have shown that during satisfactory operation over 99.99 percent of the hydrogen is transmitted thru the metal foil at current densities of 25 amp/ft$^2$ or higher in 70 percent NaOH at 200° C when the electrolyte thickness is 0.050 inch compared to a Pd-25Ag foil cathode thickness of 0.003 inch.

The requirements for satisfactory operation of hydrogen diffusion electrodes in the electrolysis mode to achieve practically 100 percent hydrogen transmission are that the surfaces be clean and free of contamination and that the conditions be maintained during extended operation. Procedures for cleaning and activation of Pd-25Ag hydrogen diffusion electrodes have been described in the published literature. The electrolyte used in the electrolysis cell is initially purified by extensive pre-electrolysis in a separate cell prior to use. Materials used in the cell in contact with the electrolyte must have resistance to corrosion, deterioration, or dissolution in the electrolyte during operation. It has been found that polytetrafluoroethylene (PTFE) offers unique resistance to chemical attack in concentrated caustic up to 80 percent NaOH at elevated temperatures up to 250° C and it is the preferred material for use where a nonconductive material is required for insulation between adjacent cells or where its excellent hydrophobic properties are required in the floating oxygen electrode.

The positive electrode metal must be resistant to chemical and electrochemical attack particularly in the electrolysis mode of operation. Excessive anodic dissolution of the positive electrode would contaminate the electrolyte and subsequently the hydrogen diffusion electrode so that the necessary satisfactory operation at practically 100 percent hydrogen transmission would be lost. It has been found that platinum and platinum alloys such as platinum-10 rhodium provide excellent corrosion resistance in caustic electrolyte at elevated temperature and do not cause contamination of the negative electrode during extended operation in either the electrolysis mode, fuel-cell mode, or open-circuit mode. Platinum is used in the temperature range of 100° C to about 200° C. Platinum-10 rhodium is about 10 percent more expensive but is preferred for the better corrosion resistance in the range of 200° C to 250° C. The use of platinum or platinum alloys for the positive electrode requires that the design of the positive electrode maximize the effective use of these materials. The novel floating oxygen electrode design provides for maximum effective utilization of electrode materials in both the electrolysis and fuel-cell mode while maintaining the necessary features of electronic conductivity and high corrosion resistance. In addition to low ohmic resistance in the electrolyte and the intercell electric connections, both the positive and negative electrodes must be capable of operation in both the electrolysis and fuel-cell mode at high current density with low electrode overvoltage to achieve high round-trip energy efficiency.

In this invention, the electrodes are essentially horizontal (as opposed to vertical) so as to utilize the earth's gravity field to accomplish reversible operation in the best manner. The horizontal electrode cells are arranged in a vertical stack and each cell consists of a positive electrode and a negative electrode. Of the two electrodes in each cell, the bottom electrode is fixed in position and the top electrode is suspended from the cell above by flexible connectors so that it can float on the electrolyte. The novel features of one electrode fixed and one electrode floating is advantageous in allowing for wide differences in electrolyte volume that can occur if electrolyte concentration is not closely controlled during operation. For a single unit that functions alternately in the two modes of electrolysis and fuel cell operation, the optimum electrolyte concentration can be used for each mode of operation.

The presently preferred embodiment of the present invention is that the negative or hydrogen electrode be on the bottom and fixed in position and the positive or oxygen electrode be uppermost and flexible and free to float on the electrolyte surface. The use of a solid hydrogen diffusion electrode for the lower electrode in the cell is advantageous because it is not porous and thus is impermeable to electrolyte. Thus, the electrolyte can be retained in the cell. There is no need to provide a careful balance between the electrolyte pressure and the hydrogen gas pressure. In fact there can be substantial difference between the hydrogen gas pressure and the electrolyte pressure (hydrostatic head of electrolyte in gravity field plus oxygen pressure). The difference in pressure that can be tolerated depends on the mechanical strength of the negative electrode and its supporting structure in the hydrogen cavity. The pressure differential can also be such that the hydrogen pressure is greater than the electrolyte pressure. In contrast, if the lower electrode were porous, careful differential pressure control between the gas and the electrolyte would be required to prevent loss of electrolyte by flooding as with biporous metal electrodes or flooding and/or "weeping" of electrolyte with hydrophobic electrodes used in free-electrolyte cells or flooding of matrix-type cells with porous electrodes which could occur if the differential pressure from electrolyte to gas exceeded the small capillary forces of the matrix. Thus, a pore-free metal film as the lower electrode provides assurance that the electrolyte remains in the cell without complex differential pressure control. The absence of a requirement for precise differential pressure control between the electrolyte and gas greatly simplifies the design and operation of cells of the present invention compared to alternative known designs for electrolysis and/or fuel cells.

The positive oxygen electrode has also been designed to eliminate the need for complex differential pressure control between the oxygen and the electrolyte. In embodiments of the invention in which the porous positive electrode contains a porous hydrophobic layer on the top surface, there is no significant differential pressure between the oxygen and the electrolyte. The porouse hydrophobic layer is not wettable by the electrolyte and is partially supported by the surface tension of the electrolyte. Since the positive electrode is attached to the hydrophobic surface, it is indirectly supported by the electrolyte surface tension and sometimes supported partially by the flexible electrical connections to the positive electrode from the cell above. The design of the positive electrode is such that the weight of the electrode plus any small positive or negative force of the flexible connectors does not exceed the surface tension force of the electrolyte in contact with the hydrophobic layer.

Since the electrolyte is contained in a pan and is open to the oxygen atmosphere (i.e. oxygen and water vapor) there is no differential pressure between the electrolyte and the gas, whether the oxygen is at atmospheric pressure or up to 1000 psi. The absence of any significant differential pressure between the electrolyte and oxygen is advantageous in that it avoids "weeping" of the hydrophogic layer (penetration of hydrophobic layer by electrolyte) that is often encountered with hydrophobic fuel cell electrodes that have to contend with differences in hydrostatic pressure of the electrolyte depending on the orientation in a gravity field. The porous positive electrode of this invention is oriented horizontally at the electrolyte surface to minimize hydrostatic pressure gradients.

A significant operational advantage is gained by the use of a floating oxygen electrode that is absent for electrodes of fuel cells or electrolysis cells designed according to the prior art. With at least one of the two electrodes in the cell free to move, it is possible to accomodate to wide changes in electrolyte volume without adverse effect on cell performance, such as flooding or drying out. For example, porous electrodes of the prior art are fixed in position and rigidly attached to current collector assemblies for thin electrodes or at the edges of the electrode for thicker self-supporting electrodes. The net effect is that the active electrode surface is fixed in space and the electrolyte interface is free to move in relation to the electrode surface. If the electrolyte dilutes and increases in volume, flooding occurs. If the electrolyte concentrates and decreases in volume, drying occurs. These problems are avoided by the floating electrode and cell design of the present invention. If the electrolyte volume changes during operation as a result of dilution or concentration, the interelectrode spacing automatically adjusts to the volume of electrolyte. Changes in electrolyte volume have no effect on the important relationship between the oxygen/electrolyte interface and the positive oxygen electrode. This is most important for the fuel-cell mode of operation.

Accomodating changes in electrolyte volume has heretofor been a serious problem in fuel-cell design of the prior art where both porous electrodes are essentially fixed. Attempts to minimize the problem have included (1) auxiliary reservoirs to accomodate excess electrolyte, which greatly complicates cell design, (2) use of relatively thick porous electrodes to insure that with electrolyte volume change the electrolyte gas interface will maintain contact with at least a portion of the active electrode surface even though such thick electrodes are inefficient and wasteful of catalyst area, and (3) very careful control of mass transfer of water vapor and heat transfer to maintain the electrolyte in a very narrow range of electrolyte concentration to minimize volume change. All of these expedients have proven to be complex and costly either in cell construction or in operational controls.

The ususal problems associated with electrolyte volume change are eliminated by the floating porous oxygen electrode design of the present invention. It is possible to operate the cell over a wide range of electrolyte concentration in either the electrolysis or the fuel-cell mode. For an electrolyte held in a pan-shaped container, the electrolyte level rises and falls with change in electrolyte concentration. The change in electrolyte height for a given change in electrolyte concentration is a percentage of the initial height. Thus, the smaller the height or interelectrode spacing, the smaller the absolute change in the electrolyte level. For example, a floating oxygen electrode was operated in a cell with an interelectrode spacing of ¼ inch in an aqueous electrolyte of 80 percent NaOH at 200° C and was also operated as the electrolyte was diluted to 50 percent NaOH causing an increase in volume and increase in electrolyte height and interelectrode spacing to about ½ inch. A fixed electrode of 0.003-inch thickness would have flooded or been about ¼ inch below the oxygen/electrolyte interface. With the floating electrode, the distance from the positive oxygen electrode to the oxygen/electrolyte interface remained unchanged as the electrolyte was diluted and the interelectrode spacing increased.

The ability of the floating electrode to maintain the distance from the oxygen/electrolyte interface to the electrode is extremely important for the use of thin electrodes particularly in the fuel-cell mode of operation where it is desirable to maintain the minimum diffusional distance for oxygen through the electrolyte.

The ability of the cell of the present invention to readily adjust to various electrolyte concentrations is advantageous for a device that operates alternately in both the electrolysis and fuel-cell modes. For example in the electrolysis mode the cell typically is operated at high temperature and high NaOH concentration as shown below:

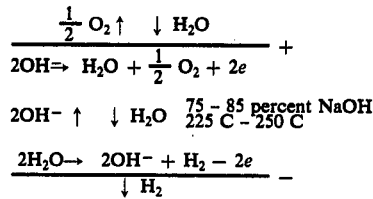

In the water electrolysis mode, high operating temperature favors low electrode overvoltage. Particularly, the polarization of the hydrogen diffusion electrode is lowered at high temperature because of greater hydrogen diffusivity. Also, the electrode reaction at the negative electrode, where water is consumed, leads to an increase in hydroxyl concentration (increase in electrolyte concentration) and decrease in hydrogen solubility and diffusivity which favors high current efficiency or high hydrogen transmission. Also, water consumed in electrolysis is being supplied to the electrolyte at the positive electrode from the water vapor in the atmosphere (water vapor plus oxygen) and mass transfer is favored by a high differential partial pressure of water vapor (i.e., low equilibrium partial pressure of water in high concentration electrolyte).

In the fuel-cell mode of operation, the cell typically is operated at high temperature and low NaOH concentration as shown below:

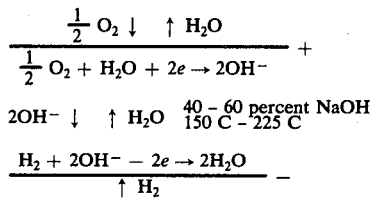

In the fuel-cell mode, lower electrolyte concentration increases the solubility and diffusivity of oxygen. The rate of diffusion of dissolved oxygen through the electrolyte from the oxygen/electrolyte interface to the oxygen electrode surface is directly proportional to the product of the solubility and the diffusivity of oxygen. Thus, reduced oxygen diffusion overvoltage and higher limiting current density for the positive electrode results from lower electrolyte concentration. Increase in temperature also increases oxygen diffusivity and the highest temperature is preferred consistent with good corrosion resistance of the positive electrode. The combination of higher temperature and low electrolyte concentration increases the equilibrium partial pressure of water vapor in the electrolyte which favors mass transfer of water vapor from the electrolyte to the atmosphere. Since water is being consumed in the electrode reaction at the positive electrode in the fuel-cell mode, it is desirable to use a high water vapor pressure in the atmosphere so that the thin electrolyte film at the oxygen electrode does not become concentrated relative to the bulk electrolyte. The high water vapor pressure in the recirculted atmosphere in the fuel-cell mode is desirable to aid in condensation of water remote from the cells to remove the net water formed by the overall reaction of hydrogen and oxygen.

The change in electrolyte level for change in electrolyte concentration can be calculated from published data on the density of aqueous sodium hydroxide solutions as a function of temperature. For example, the density ($\delta$) of sodium hydroxide solutions is related to the density of water at the same temperature by the following empirical relationship which is accurate within a few percent: $\delta = \delta H_2O + 0.1064$ (wt percent NaOH). The amount of electrolyte (as 100 percent NaOH) initially added to the cell is selected to provide the optimum interelectrode spacing when diluted to operating concentration. The flexibility of the intercell connectors to the positive electrode is designed to accomodate the range of vertical movement of the floating positive electrode to be encountered in operation of the cell at optimum electrolyte concentration for each mode of operation. For example, in a cell as shown in FIG. 1 the nominal interelectrode spacing might be selected as 0.035 inch for 50 percent NaOH at 225° C. For a thin positive electrode of 0.003-mil thickness located near the oxygen/electrolyte interface, the height is measured from the top surface of the negative electrode vertically up to the oxygen/electrolyte interface. The calculated change in interelectrode spacing with change in electrolyte concentration is shown below:

| Electrolyte Concentration at 225 C, weight percent NaOH | Interelectrode Spacing, inch |
|---|---|
| 89.5 | 0.015 |
| 63.7 | 0.025 |
| 50 | 0.035 |
| 41.5 | 0.045 |

| Electrolyte Concentration at 225 C, weight percent NaOH | Interelectrode Spacing, inch |
| --- | --- |
| 36 | 0.055 |

Typically, electrolysis mode operation might be conducted at about 75 weight percent NaOH concentration and fuel-cell mode operation might be conducted at about 40 percent NaOH concentration. The transition from a high electrolyte concentration to a low electrolyte concentration following charging (electrolysis mode) or vice versa following discharge (fuel-cell mode) occurs relative fast since the amount of water in the electrode is relatively small compared to the amount of water consumed in the reaction. For example, assuming no transfer of water vapor between the atmosphere and the electrolyte, the difference in water content of the electrolyte between 40 weight percent NaOH and 75 weight percent NaOH is equal to the water consumed or produced during 41.4 minutes of operation at 355 amp/ft$^2$ current density compared to about 28 hours of total net charging for a weekly cycle. In practice, the change in electrolyte concentration can be accomplished during the interval (usually about 1 hour) between the change in mode of operation by adjustment of the water content of the recirculated atmosphere to effect concentration or dilution of electrolyte as desired.

An important feature of the present invention is that with a floating oxygen electrode the distance between the oxygen/electrolyte interface and the oxygen electrode does not change with change in electrolyte concentration. This is particularly important for operation in the fuel-cell mode since the reaction rate (current density) is highly dependent on oxygen transport (i.e., diffusion of dissolved oxygen from the oxygen/electrolyte interface to the oxygen electrode). Theory (Fick's Law of Diffusion) predicts that the limiting current density should be inversely proportional to oxygen diffusion distance. Also, oxygen solubility is proportional to oxygen partial pressure according to Henry's Law and the limiting current density is proportional to oxygen partial pressure in Henry's Law is obeyed over the range of oxygen partial pressure.

The linear relationship of current density and oxygen partial pressure was demonstrated with a cell constructed according to the present invention with a floating oxygen electrode.

EXAMPLE 1

An experimental cell was constructed as shown in FIG. 2. The pann containing the electrolyte was machined from solid PTFE to have dimensions of 0.5 inch × 0.75 inch by 0.5 inch deep. The negative electrode was a palladium-silver alloy (Pd-25Ag) tube, 0.062-inch diameter, 0.003-inch wall thickness, 0.625-inch long with one end closed that protruded through the side of the pan and was located in the lower portion of the pan. The positive electrode was platinum-rhodium alloy (Pt-10Rh) woven screen 80-mesh, 0.003-inch diameter wire which was rolled flat to a thickness of about 0.003 inch.

The top surface of the screen was covered with microporous PTFE, 0.0015-inch thick, 0.2 μm maximum pore size, 75 percent porosity pressed into close contact with the underlying screen. The edges of the electrode were bent up about 0.062 inch on all sides so that the electrode floated on the electrolyte surface like a boat. Flexible wires (Pt-10Rh, 0.003-inch diameter) provided electrical connection to the positive electrode so that the electrode could rise and fall with electrolyte level as the electrolyte concentration changed in the range of 50 to 85 weight percent NaOH and the cell temperature was raised from 150° C to 230° C.

At a cell temperatuure of 225° C and about 70 weight percent NaOH with a hydrogen pressure of 100 psia at the negative electrode and a total pressure of 100 psia above the positive electrode (50 psia water vapor and 40 psia oxygen) the fuel-cell mode current density was 5 amp/ft$^2$ at a 0.75 volt. The current density increased linearly as the oxygen partial pressure was increased. At a pressure of 320 psia (60 psia water vapor and 260 psia oxygen, 320 psia hydrogen) the fuel-cell mode current density was 33.8 amp/ft$^2$ at 0.75 volt. At the latter conditions, the electrolysis mode cell voltage was 1.5 volts which corresponds to a reversible electrolyzer efficiency of 50 percent (electrical energy out divided by electrical energy in). The cell was cycled between electrolysis and fuel-cell operation for 700 cycles (6 minutes per cycle) over 70 hours with essentially no change in performance. The cell was operated for a total of 670 hours with no apparent degradation of the electrodes.

EXAMPLE 2

A cell was constructed as in Example 1 except that the positive electrode was an electroformed platinum screen, 1000-mesh, 0.0003-inch wire width, and 0.00006inch thick. The electroformed screen was coated on one side with a water dispersion of PTFE and bonded to the microporous PTFE by curing at 270° C for 1 hour with light pressure. The boat-like electrode was formed using a 0.001-inch thick platinum foil picture frame around the electroformed screen. The frame was covered by PTFE to expose a screen area of 0.25 inch × 0.34 inch.

The procedure for forming and handling the very thin screen electrode was as follows: a nickel electroforming mandrel with appropriate stop-off was plated first with about 0.0001-inch thickness of low stress nickel followed by 0.00006-inch thickness of platinum. The platinum picture frame was spot-welded to the electroformed platinum on the mandrel. The surface was coated with a water dispersion of FEP fluorocarbon and the microporous PTFE sheet added and bonded with heat (270° C) and light pressure (about 5 psi) for 30 minures. Thereafter, the nickel was dissolved from the platinum electroform in an aqua regia solution.

The 0.00006-inch thick platinum screen utilized only 1.7 mg platinum per square centimeter and was located very close to the microporous PTFE and the oxygen/electrolyte interface. At 205° C with an electrolyte concentration of about 63 weight percent NaOH, a fuel-cell mode current density of 48 amp/ft$^2$ (based on projected area of 0.00006 ft$^2$) was obtained at 0.75 volt and a pressure of 315 psia (50 psia water vapor and 265 psia oxygen).

EXAMPLE 3

A cell was constructed as in Example 1 with an electroformed platinum screen as in Example 2, except that the screen thickness was only 0.00003-inch (0.85 mg Pt/cm$^2$). The screen (0.2 inch × 0.2 inch) was spot-welded to a 0.005-inch thick diameter platinum wire frame which was held against the microporous PTFE heet on the bottom of the boat (shaped from 0.03-inch thick PTFE) by the flexible platinum lead wires extending through the bottom of the PTFE boat and microporous PTFE. The cell was operated in the fuel-cell mode at pressures up to 1015 psia with a linear relationship between fuel-cell mode current density at a cell discharge voltage of 0.75 volt over the range of 100 to 1015 psia investigated. At the highest total pressure (hydrogen 1015 psia, water vapor 42 psia, oxygen 973 psia) the current density was 27 amp/ft$^2$, based on the projected area of the positive electrode (0.00028 ft$^2$ or 0.26 cm$^2$). The ratio of weight of platinum electrode to fuel-cell current at 0.75 volt was 0.03 g platinum per ampere.

EXAMPLE 4 an experimental cell was constructed as in Example 1 and operated for over 600 hours in the water electrolysis mode at temperatures from 150° C to 235° C with an electrolyte concentration from 50 to 85 weight percent NaOH. The pressure was varied from atmospheric to 460 psia. Typical performance was obtained at the following operating conditions after 400 hours:

| | |
|---|---|
| Cell temperature | 225 C |
| Electrolyte concentration | ~70 weight percent NaOH |
| Water vapor partial pressure | 60 psia |
| Oxygen partial pressure | 265 psia |
| Hydrogen pressure | 325 psia |
| Theoretical open circuit voltage | 1.198 volt |
| Cell voltage | 1.498 volt |
| Current | 0.033 amp |
| Positive electrode current density | 33 amp/ft$^2$ |
| Negative electrode current density | 39 amp/ft$^2$. |

The IR-free voltage equation was:

$$E = E_o + a + b \log i$$

where
$E$ = cell voltage
$E_o$ = theoretical open circuit voltage = 1.198 volt
$i$ = current density (positive electrode), amp/ft$^2$
$a$ = 0.118 volt
$b$ = 0.097.

EXAMPLE 5

An experimental cell was constructed as in Example 1 except that the positive electrode was made from three layers of Pt-10Rh screen 80-mesh, 3-mil diameter wire. The electrode was shaped like an inverted "U" with the two vertical legs resting on the bottom of the pan and the remaining horizontal portion of the electrode parallel to the bottom of the pan as shown in FIG. 2, except that no microporous PTFE was used and the positive electrode did not float on the electrolyte surface. The horizontal portion of the electrode was wet by electrolyte which crept up the vertical legs by a combination of surface tension and capillary action. The volume of the bulk electrolyte was sufficient to cover the horizontal hydrogen diffusion electrode (Pd-25Ag tube, 0.0625-inch diameter, 3-mil wall).

At atmospheric pressure (oxygen partial pressure of 10 psia, the fuel-cell mode current density at 0.75 volt was 0.6 amp/ft$^2$ based on the projected area of 0.0017 ft$^2$ (horizontal portion of positive electrode of 0.5 inch × 0.5 inch). At 174° C with an electrolyte of 73 weight percent NaOH (6.5 psia partial pressure of water vapor), the positive electrode current density increased linearly with increase in oxygen partial pressure from 4 amp/ft$^2$ at 60 psia to 10.8 amp/ft$^2$ at 160 psia.

the essential features of the cells in the above examples which embody the design principles of the present invention are:

1. The negative electrode was a hydrogen diffusion electrode that transmitted practically 100 percent hydrogen in the electrolysis mode, and no separator diaphragm or matrix was required between the positive and negative electrode to separate hydrogen and oxygen gas.
2. The cells could be operated over a wide range of electrolyte concentration and electrolyte volume without change in the distance from the oxygen-/electrolyte interface to the positive oxygen electrode, which allowed the use of a thin platinum positive electrode and with no differential pressure control between the oxygen atmosphere and the electrolyte.
3. The ratio of true surface area (double layer area) to projected area of the positive oxygen electrode was small to minimize chemical corrosion at elevated temperature while achieving practical current densities based on projected area.
4. The fuel-cell mode current density of the positive electrode varied linearly with oxygen partial pressure as follows:

$$i = k(P - P_{H_2O}) = K P_{O_2}$$

where
$i$ = fuel cell mode current density at constant cell voltage (e.g., 0.75 volt), amp/ft$^2$
$P$ = total pressure of atmosphere above positive electrode, psia
$P_{H_2O}$ = partial pressure of water vapor, psia
$P_{O_2}$ = partial pressure of oxygen, psia
$k$ = coefficient for operating conditions, amp/ft$^2$ per psia.

The numerial value of k is determined principally by the electrode structure and operating conditions. The value of $k$ varies as follows:

1. Directly proportional to the ratio of true electrode surface area to projected positive electrode area.
2. Inversely proportional to means distance of the positive electrode from the oxygen/ electrolyte interface.
3. Increases with increase in the cell operating temperature.
4. Increases with decrease in the electrolyte concentration.
5. Increases with increase in polarization of the oxygen electrode from open circuit.

The linear relationship between oxygen partial pressure and fuel-cell mode performance of the oxyen electrode clearly distinguishes the novel positive electrode design of the present invention from fuel-cell electrodes of the prior art. For electrodes of the prior art, it was well established that the current density varied as the square root of the oxygen partial pressure. For example, Hartner et al (Hartner, A. J., Vertes, M. A., Medina, V. E., and Oswin, H. G., "Effects of Oxygen Partial Pressure on Fuel Cell Cathodes", pp 141–152 in *Fuel Cell Systems*, Advances in Chemistry Series No. 47, American Chemical Society, Washington, D.C. 1965) experimentally demonstrated the square root relationship for various polished plate oxygen electrodes (silver, gold, palladium, and platinum) with the electrode suspended above the electrolyte just touching the top of the electrolyte surface to create the classical three-phase interface of oxygen, metal, and electrolyte (actually a thin film meniscus where electrolyte wet the electrode). They demonstrated that current varied as the square root of the oxygen partial pressure over the range of 0.1 to 10 atmospheres of oxygen pressure in 5 M KOH at 25° C. The experimental performance correlated with oxygen electrode performance of complex porous electrode structures at 200° C commonly observed with fuel-cell electrodes of the prior art. The fact that current density did not increase linearly with oxygen pressure for typical fuel-cell electrodes of the biporous type was recognized earlier in the classic development of these electrodes for the Bacon fuel cell from the 1930's to 1950's.

Quoting the developers of the Bacon fuel cell: "It has been found experimentally that the net effect on performance is to double the current density attainable at a given cell voltage for a tenfold increase in pressure (for output voltages of 0.7 to 0.8 volt)." (Adams, A. M., Bacon, F. T., and Watson, R. G. H., "The High Pressure Hydrogen-Oxygen Cell", p 161, *Fuel Cells, Edited by Will Mitchell, Jr., Chemical Technology Monograph, Vol., Academic Press, New York* (1963).

As shown in Example 3 for the cell of the present invention, the fuel-cell mode current density was 2.7 amp/ft$^2$ at 96 psia oxygen partial pressure and increased tenfold to 27 amp/ft$^2$ for a tenfold increase in oxygen partial pressure to 960 psia rather than an increase to only 8.54 amp/ft$^2$ as predicted for porous fuel cell electrodes of the prior art.

It is believed that the oxygen electrode of the present invention is superior to those of the prior art because at high current density the electrolyte conduction does not occur through a long thin film of electrolyte. Porous fuel cell electrodes of the prior art have been designed to obtain thin film of electrolyte over the electrode or catalyst surface. This thin electrolyte film (on the order of 0.5 μm) minimizes oxygen transport through the electrolyte to the metal electrode surface but requires that the electrolyte conduction also be accomplished through this thin film. The electrolytic conductance problem in the thin film predominates at high current density and performance does not improve proportionally with increase in oxygen partial pressure. The thin film theory had become accepted in fuel cell technology to explain the behavior of porous electrodes of the prior fuel cell art. Comprehensive theoretical analysis of porous electrode behavior (as in Rockett, J. A., and Brown, R., "Theory of the Performance of Porous Fuel Cell Electrodes", Journal of the Electrochemical Society, 113 (3) pp 207–213, March, 1966.) has evolved mathematical equations confirming that according to the thin film theory the fuel cell current density varies with the square root of the oxygen partial pressure as observed for biporous electrodes or porous electrodes with a matrix.

In contrast, the oxygen electrode of the present invention avoids the limitations of the classical thin film theory. While the electrode of the present invention is located close to the oxygen/electrolyte interface so that oxygen has to diffuse through only thin electrolyte film, electrolytic conduction through a long, thin electrolyte film is avoided. The electrolytic conduction distance through the electrode is no greater than the electrode thickness, which is about the same dimensions (0.00003 inch or 0.75 μm) as the "thin film" for oxygen diffusion. Thus, with electrodes of the present invention, the electrolyte resistance within the electrode is not a factor limiting performance, and current density is limited only by the rate of transport of oxygen to the electrode. Thus, fuel cell current density increases linearly with oxygen partial pressure in accordance with gas diffusion theory and results in greatly improved performance at high oxygen partial pressure.

EXAMPLE 6

A large experimental cell was constructed as in FIG. 2 using tubular hydrogen diffusion electrodes, a flexible floating-membrane-type oxygen electrode, and an electrolyte of aqueous sodium hydroxide that could be varied from 45 to 75 weight percent NaOH during cell operation in both the electrolysis and fuel cell mode. The pan containing the electrolyte was machined from solid PTFE and had dimensions of 12.5 inches × 3.25 inches × 0.2 inch deep.

The hydrogen electrode consisted of 50 tubes of Pd-25Ag alloy (1/16-inch OD × 0.003-inch wall) welded closed at one end and at the other end brazed to stainless steel hydrogen headers (⅛-inch OD, 1/16-inch ID, 13-inches long) outside the PTFE cell body. The two headers on opposite sides of the cell each had 25 tubes which penetrated and fit tightly in one wall of the PTFE cavity and the closed end of the tube fit loosely in a blind hole in the opposite wall of the cavity. The exposed length of tube was 3¼ inches and the total surface area of 50 tubes was 0.22 ft$^2$.

The oxygen electrode was made from woven Pt-10Rh screen (3-mil diameter wire) 3 inches wide and 12¼ inches long, bonded to the underside of a sheet of microporous PTFE (1.5 mils thick) which was in turn bonded to a metal picture frame having inside dimensions of 3¼ inch × 12½ inches. Current was conducted from the metal picture frame to the screen by numerous flexible tabs of Pt-10Ph foil (1-mil thick × ⅛ inch wide) welded to the edges of the screen and the metal picture frame. The platinum alloy screen was bonded to the microporous PTFE using an aqueous suspension of PTFE and heat and pressure. To insure that the screen remained in close contact with the microporous PTFE, numerous small discs (⅛-inch diameter) of microporous Teflon (10-mil thick) located on ½-inch centers, were impregnated with aqueous suspension PTFE and bonded to the underside of the Pt-10Rh screen and the microporous PTFE sheet. The projected area of the Pt-10Rh screen minus the area covered by the discs was estimated to be 0.24 ft$^2$ and this area of the oxygen electrode was used in calculating cell current density. For the above oxygen electrode design, referred to as the "flexible-floating-membrane-type", the electrode was restrained at the edges of the cell but flexible over most of the central area and free to float on the electrolyte surface.

The cell was assembled by adding electrolyte to the PTFE cell body containing the Pd-25Ag tubes and attaching the picture frame containing the oxygen electrode (screen side down) to the top of the PTFE cell body and holding in place with the bolts around the edges of the cells to effectively seal the electrolyte within the cell. After assembly, the cell could be tilted (10° to 20°) without loss of electrolyte but was normally operated in a level horizontal position inside a high pressure autoclave.

The amount of 100 percent NaOH contained in the electrolyte initially added to the cell was selected such that if diluted to 60 percent NaOH at an operational cell temperature of 200° C, the volume of electrolyte would be sufficient to float the oxygen electrode in essentially a horizontally position with the oxygen electrode level (electrolyte level) about 0.2 inch from the bottom of the electrolyte cavity and 0.14 inch above the axis of the Pd-25Ag tubes. Relative to the nominal oxygen electrode/electrolyte level at 60 percent NaOH, calculations for this cell indicated a level of 0.055 inch below nominal at 75 percent NaOH and a level 0.080 inch above nominal at 45 percent NaOH. The cell was operated in both the fuel cell mode and electrolysis mode at electrolyte concentrations from 45 to 75 percent NaOH over a period of 100 hours. The average interelectrode spacing from the mean oxygen electrode height to the axis of Pd-25Ag tubes was varied from 0.020 inch to 0.155 inch for 75 and 45 percent NaOH concentrations respectively relative to the nominal 0.075 inch spacing for 60 percent NaOH. Since the edges of the oxygen electrode are fixed the actual shape of the oxygen electrode is convex near the edges for high electrolyte concentration and concave near the edges for low electrolyte concentration relative to 60 percent NaOH.

To prevent inadvertant contact of the oxygen electrode and Pd-25Ag tubes at high electrolyte concentration (low electrolyte level and interelectrode spacing relative to nominal), an open-mesh PTFE cloth insulator was used between the electrodes. The cloth insulator of open-mesh (20 threads per inch, 5-mil thread thickness, 9-mil total thickness) served only to prevent inadvertent short circuits between the oxygen electrode and Pd-25-Ag tubes under abnormal operating conditions (too high electrolyte concentration). The cloth insulator did not wet and retain electrolyte by capillary action as with a conventional matrix or prevent admixing of hydrogen and oxygen gas as with small pore-size diaphragms, conventional, separators, or matrices. The PTFE cloth separator served the same function of establishing a lower limit for oxygen electrode movement as such alternatives of legs 46 in the oxygen electrode as shown in FIG. 2 or insulating ribs forming part of the PTFE cell cavity and extending above the Pd-25Ag tube level as used in the design of the cell for Example 7.

The actual performance of the cell was a function of the operational conditions (e.g. cell temperature, electrolyte concentration). For example, after the cell had been in operation for 5 hours and at a temperature of 190° C, the current-voltage performance of the cell could be described by the following equation from data obtained 15 minutes after electrolysis was originated at 9.2 amp/ft² (2.2 amperes) over the current range of 1 to 20 amperes (4.2 to 83 amp/ft²):

$$E = (E_{ocv} + a^*) + b \log i + ci$$

$E$ = cell voltage, volt $i$ = current density, amp/ft² where
$i$ = 0.0015 ohm-ft²
$b$ = 0.070 volts/decade
$E_{ocv} + a^*$ = 1.320 volts
$a^*$ = 0.107 based on theoretical open circuit voltage ($E_{ocv}$)
$E_{ocv}$ = 1.213 volt calculated from the following operating conditions:

| | |
|---|---|
| cell temperature | 190 C |
| hydrogen pressure | 115 psia |
| autoclave pressure | 125 psia |
| oxygen partial pressure | 109 psia |
| partial pressure of water vapor in equilibrium with electrolyte | 6 psia |
| electrolyte concentration | ~ 75 wt percent NaOH |

The cell was operated in the fuel-cell mode over a period of 7 hours (4½ hours prior to electrolysis and 1¼ hours following electrolysis) at various temperatures in the range of 125° C to 203° C and various autoclave pressures (oxygen partial pressure plus water vapor partial pressure) from 95 psia to 565 psia and hydrogen pressures approximately equal to autoclave pressure within ± 10 psi. For essentially constant electrolyte concentration of about 75 percent NaOH, the fuel cell current density at 0.75 volt discharge increased with increasing temperature at constant autoclave pressure of 100 psia as follows:

| | |
|---|---|
| 125 C | 1.2 amp/ft² |
| 151 C | 2.1 " |
| 156 C | 3.1 " |
| 176 C | 3.7 " |
| 193 C | 5.2 " |

The fuel-cell-mode current density increased linearly with oxygen partial pressure according to the following equation $$i = k(P - p_{H_2O}) = k p_{O_2}$$

where
$i$ = current density, amp/ft²
$P$ = autoclave pressure, psia
$p_{H_2O}$ = partial pressure of water vapor at the oxygen/electrolyte interface (~ partial pressure of water vapor in equilibrium with the electrolyte), psia
$p_{O_2}$ = partial pressure of oxygen in atmosphere at oxygen/electrolyte interface, psia.

The value of $P_{H_2O}$ for the above equation is estimated empirically by extropolation of the linear curve of current density versus autoclave (total) pressure to zero current density. The intercept is the value of $P_{H_2O}$ and the slope of the curve is the fuel cell mode performance coefficient ($k$). For example, at 203° C the fuel cell current density was 25.8 amp/ft² at $P$ = 565 psia and $p_{H_2O}$ = 505 psia. Since the electrolyte concentration was about 75 percent NaOH ($p_{H_2O}$ = 13 psia), the oxygen partial pressure by difference was 552 psia and the calculated performance coefficient was $k$ = 0.047 amp/ft² per psia of $O_2$.

When the electrolyte concentration (and the partial pressure of water) were not known exactly, an approximate fuel cell performance coefficient ($k'$) was calculated by dividing the current density by the total autoclave pressure. The values of $k'$ and $k$ are approximately equal at low cell temperature and high electrolyte concentration when the partial pressure of water vapor is small compared to the total autoclave pressure.

Based on the above performance with 75 percent NaOH at 190° C to 203° C, a water battery voltage efficiency of 50 percent could be obtained by discharge in the fuel cell mode at 42 amp/ft² and 0.75 volt ($P$ = 906psia) and charge in the electrolysis mode at 42 amp/ft² and 1.5 volt. Assuming equal charge and discharge time, the energy efficiency of the cell would be 50 percent.

After 124 hours of cell evaluation, and with the electrolyte diluted to about 44 percent NaOH at the following conditions:

| | |
|---|---|
| cell temperature | 197 C |
| $pH_2$ | 98 psia |
| P | 115 psia |
| $p_{O_2}$ | 20 psia |
| $p_{H_2O}$ | 95 psia | the electrolysis mode performance after 21 minutes of electrolysis at 9.2 amp/ft² was:

$$E = (1.142 + 0.112) + 0.070 \log i + 0.0014 i$$

and the fuel cell mode performance coefficient over the range of 135 psia to 215 psia was $k = 0.19$ amp/ft² per psia.

Based on the above performance with 44 percent NaOH at 197° C, a water battery efficiency of 50 percent could be obtained by discharge in the fuel cell mode at 80 amp/ft² and 0.75 volt (P = 440 psia) and charge in the electrolysis mode at 80 amp/ft² and 1.5 volt.

The cell was evaluated over a period of 125 hours in both the electrolysis and fuel cell mode with intervening periods of open circuit. There was no evidence of corrosion of the Pt-10Rh alloy oxygen electrode or the Pd-25 Ag hydrogen diffusion electrode when inspected after 120 hours at temperatures above 200° C.

EXAMPLE 7

A large-area cell (3¼-inch × 12½-inch) of construction similar to that in Example 6 was operated in a cyclic manner to demonstrate reversibility and evaluate performance over a wide range of cell temperatures (143° C to 196° C), electrolyte concentration (50 to 75 percent NaOH), autoclave pressures (50 to 565 psia), hydrogen pressures (15 to 355 psia) and differential pressures (0 to 200 psia) of autoclave pressure (oxygen + water vapor) versus hydrogen pressure. Six cycles of electrolysis mode operation followed by fuel cell mode operation were conducted during the first 73 hours of cell operation. Usually, there was 1 to 5 minutes of open circuit stand between each mode of operation.

| Cycle 4 (Elapsed Time From Start Up Was 5 Hours and 7 Minutes) | | |
|---|---|---|
| Electrolysis Mode Operation for 51 Minutes | | |
| Operating Conditions. | Cell Temperature | 143 C |
| | Hydrogen pressure | 15 psia |
| | Autoclave pressure | 190 psia |
| | Electrolyte concentration | ~ 75 percent NaOH |
| | Constant current | 2.4 amperes (10 amp/ft²) for 30 minutes 7.2 amperes (30 amp/ft²) for 21 minutes |

Collected 85 cm³ of hydrogen (90% of theoretical) during 5-minute period beginning 20 minutes after electrolysis and with a cell voltage of 1.614 to 1.617 volts at 10 amp/ft².

Collected 57 cm³ of hydrogen (100% of theoretical) during 1-minute period beginning 44 minutes after electrolysis and with a cell voltage of 1.764 volt at 30 amp/ft².

Open Circuit for 3 Minutes at which Time Actual Open Circuit Cell Voltage Was 1.108 Volt Fuel Cell Mode Operation for 123 Minutes Under the same conditions as for electrolysis, the fuel cell mode current density was 1.2 amp/ft² at 0.75 volt ($k = 0.007$ amp/ft² per psia of autoclave pressure). With cell temperature increased to 153° C, and hydrogen pressure to 115 psi, the current density was 2 amp/ft² ($k' = 0.01$ amp/ft² per psia autoclave pressure).

| Cycle 5 (Elapsed Time From Start Up Was 23 Hours and 15 Minutes) | | |
|---|---|---|
| Electrolysis Mode Operation for 27 Minutes | | |
| Operating Conditions. | Cell Temperature | 125 C |
| | Hydrogen pressure | 125 psia |
| | Electrolyte concentration | ~ 75 percent NaOH |
| | Constant current | 2.4 amperes (10 amp/ft²) for 27 minutes at which time cell voltage was 1.681 volts. |

Fuel Cell Mode Operation for 4 Hours and 17 Minutes

Under the same conditions as for electrolysis, the fuel cell mode current density was 2 amp/ft² at 0.75 volt ($k' = 0.01$ amp/ft² per psia) during the first 15 minutes.

The cell temperature was increased to 182° C and the autoclave pressure was increased to 565 psia (hydrogen pressure to 335 psia) over the next 4 hours.

During the last 5 minutes with autoclave pressure reduced to 190 psia and hydrogen pressure to 15 psia, the fuel cell current density was 7 amp/ft² ($k' = 0.037$ amp/ft² per psia) at 182° C.

| Cycle 6 (Elapsed Time From Start Up Was 28 Hours and 4 Minutes) | | |
|---|---|---|
| Electrolysis Mode Operation for 68 Minutes | | |
| Operating Conditions. | Cell Temperature | 182 C |
| | Hydrogen pressure | 15 psia |
| | Autoclave pressure | 190 psia |
| | Electrolyte concentration | ~ 75 percent NaOH |
| | Constant current | 2.4 amperes (10 amp/ft²) for 68 minutes |

During the first 34 minutes, the cell voltage increased to a steady-state value of 1.475 volts at 10 amp/ft² which was maintained for the next 15 minutes during which time 90 cm³ of hydrogen (100 ± 1% of theoretical within experimental errors) was collected over a 5-minute period. The latter condition corresponds to "100 percent hydrogen transmission" and essentially no hydrogen gas bubbles are formed on the electrolyte side of the Pd-25Ag tube. During the last 19 minutes, no hydrogen was released from the cell and the hydrogen pressure increased to 75 psia and the cell voltage increased by 0.027 volt to 1.502 volt in accordance with theory. During the induction period at the beginning of electrolysis, the concentration of hydrogen in the Pd-25Ag alloy increases to a steady-state value. Thereafter, the hydrogen gas is produced inside the Pd-25Ag tubes at a rate proportional to current in accordance with Faraday's law of electrolysis.

Fuel Cell Mode Operation for 44 Hours

The fuel cell mode performance after 5 minutes was 10.2 amp/ft² at 0.75 volt (0.054 amp/ft² per psia) at a cell temperature of 184° C, autoclave pressure of 190 psia and hydrogen pressure of 35 psia. After 131 minutes of fuel cell operation, the current density was 32 amp/ft² at 0.75 volt (0.076 amp/ft² per psia) at a cell temperature of 189° C, autoclave pressure of 420 psia and hydrogen pressure of 263 psia. After 22½ hours of fuel cell operation, the current density was 53 amp/ft² at 0.75 volt (0.12 amp/ft² per psia) at a cell temperature of 193° C, autoclave pressure of 450 psia and hydrogen pressure of 267 psia. During the last 21½ hours, the fuel cell current density was maintained in the range of 50 to 60 amp/ft² (0.10 to 0.13 amp/ft² per psia) at a cell temperature of 193° C to 196° C, autoclave pressure of 435 to 455 psia and hydrogen pressure of 267 to 280 psia. The oxygen and water vapor gas circulated across the oxygen electrode varied in temperature from 183° C to 191° C and had a partial pressure of water vapor of 62 psia which maintained the equilibrium electrolyte concentration in the range of 50 to 54 percent NaOH.

A water battery could be operated with an oxygen partial pressure of 5 to 5000 psia. It has been demonstrated that fuel cell performance (current density at a particular discharge voltage) increases linearly with oxygen partial pressure for oxygen electrodes designed according to the present invention. The major benefit of increased oxygen partial pressure is to minimize the concentration polarization at the oxygen electrode which is a major overvoltage component for fuel cell mode operation at high current density. The improvement in fuel cell performance is usually greater than would be expected from the change in theoretical open circuit voltage with oxygen partial pressure according to the Nernst equation. Thus, the voltage efficiency or energy efficiency for equal charge and discharge time increases with increase in oxygen partial pressure. Even if there were minimum concentration polarization at the oxygen electrode, it can be shown from theoretical considerations that round-trip efficiency increases with oxygen partial pressure as follows. Assume that at a particular current density the discharge voltage is 0.75 volt and the charge voltage is 1.5 volt for 50 percent voltage efficiency. Everything else being equal, a 10-fold increase in oxygen partial pressure will increase the theoretical open circuit voltage by 0.0234 volts, $$\left[ \Delta E = 0.0000992 \ \tau \log \left[ \frac{(p_{O_2})_2}{(p_{O_2})_1} \right]^{\frac{1}{2}} \right].$$

Thus, the charge voltage is increased to 1.5234 volt and the discharge voltage is increased to 0.7735 volt, for an increase in voltage efficiency to 50.7 percent. Also, an increase in oxygen partial pressure allows an increase in hydrogen pressure without necessarily increasing the differential pressure (electrolyte pressure or oxygen plus water vapor pressure versus hydrogen pressure). The effect of a 10-fold increase in hydrogen pressure is theoretically twice as great as a 10-fold increase in oxygen pressure or an increase of 0.0469 volt in the theoretical open circuit voltage. Thus, increasing hydrogen pressure alone would increase the charge and discharge voltage to 1.5469 and 0.7969 respectively for a voltage efficiency of 51.5 percent. The combined effect of a 10-fold increase in both oxygen and hydrogen partial pressure is an increase of 0.0704 volt in the theoretical open circuit voltage; a charge and discharge voltage of 1.570 volt and 0.82035 volt respectively, and a voltage efficiency of 52.2 percent. In other words, an increase in oxygen partial pressure increases the performance of a water battery by increase in voltage efficiency at a particular current density or increase in current density ar a particular voltage efficiency. An increase in voltage efficiency reduces the operating costs and an increase in nominal design current density decreases the capital cost (first cost of the battery). The effect of increase in oxygen partial pressure on performance can be the result of these effects separately or in combination:

1. Increase in theoretical open circuit cell voltage as the square root of the oxygen partial pressure increase.
2. Proportional increase in hydrogen pressure without increase in differential pressure (i.e. electrolyte pressure versus hydrogen pressure where electrolyte pressure equals the sum of the oxygen partial pressure and electrolyte water vapor partial pressure); the theoretical open circuit voltage increase as the first power of the hydrogen pressure.
3. Decrease in oxygen concentration polarization (increase in oxygen solubility) for increase in oxygen partial pressure for fuel cell mode discharge.

The first two effects are predictable from theory (Nernst equation) and increase in theoretical open circuit voltage results in increase in voltage efficiency (or round-trip energy efficiency for equal charge and discharge times).

A disadvantage of increase in oxygen partial pressure is the requirement for increased strength of container for the water battery to achieve a comparable margin of safety and consequent increase in cost and capital investment.

An advantage of increased oxygen partial pressure (and/or hydrogen pressure) is to reduce the capital investment in oxygen (and/or hydrogen compressors) for economic gas storage at high pressure.

A disadvantage of increased oxygen partial pressure (and/or hydrogen pressure) is the increased operating cost for electrochemical gas compression at the high temperatures of cell operation compared to the higher theoretical efficiency of water-cooled conventional compressors.

The relative importance of the various economic factors depends on the particular energy storage application. The optimum economic oxygen partial pressure might range from 5 to 3000 psia. The lower specific value corresponds to operation at atmospheric pressure (14.7 psia) where the oxygen partial pressure would be 5 psia for operation with 75 percent NaOH at 197 C (equilibrium partial pressure of water vapor above electrolyte is 9.7 psia). The upper specific value is typical of the commercial requirements for water electrolysis to generate gases at pressure for storage in metal cylinders without auxilliary compressors. Also 3000 psia is typical of electrolyzer pressure used on nuclear submarines for generating gases particularly hydrogen that must be discharged overboard at great depth.

A cell temperature of at least 100° C is preferred. For most applications, economic considerations require a practical current density of at least 1 amp/ft² because of the cost of electrode materials and cell construction. The hydrogen overvoltage and limiting current density for hydrogen diffusion electrodes is strongly influenced by cell temperature. A cell temperature of at least 100° C is necessary to obtain sufficiently low hydrogen overvoltage to achieve practical voltage efficiency at at least 1 amp/ft². Oxygen overvoltage and oxygen diffusivity are both temperature dependent, thus requiring a minimum temperatutre of 100° C for practical cell current density and efficiency.

The freezing point curve for pure sodium hydroxide electrolytes exhibits a minimum at about 74° C and 75 percent NaOH. At 100° C or above, electrolyte concentrations up to 75 percent NaOH are liquid even if slightly contaminated with sodium carbonate. Above 200° C, electrolyte concentrations up to 85 percent NaOH are liquid.

A commercially available alloy for gas phase hydrogen diffusion (hydrogen purification) is the Pd-25Ag alloy. Alloys in the range of 10 to 45 percent silver have high hydrogen diffusivity and alloys of 25 percent silver are reported to have the optimum diffusivity (higher than pure palladium). The higher the proportion of silver to palladium, the lower the metal cost of the alloy. There is a trade-off between lower cost and reduced diffusivity (lower limiting current density) and cell performance depending on the application. Alloys with a higher proportion of palladium to silver are more noble and probably more corrosion resistant. However, dimensional stability of the alloy for repeated charging and discharging (change in hydrogen/metal ratio) is influenced by metallurgical phase changes ($\alpha \rightleftarrows \beta$). An increase in silver content increases dimensional stability by suppressing the phase charge. The alloy of 25 percent silver is believed to offer the optimum combination of high dimensional stability, high diffusivity, and low cost compared to pure palladium.

For increase in dimensional stability it may be desirable to substitute some other element (e.g. boron) for some of the silver. Nickel might also be substituted for some of the silver for reduced metal cost.

The thickness of the negative electrode can be in the range of 0.2 to 80 micrometers (0.000008 to 0.0032 inch). The upper specific value represents a thickness of Pd-25Ag that is commercially available in the form of tubes (e.g. 1/16-inch, ⅛-inch, or ¼-inch OD with 3-mil wall thickness) that have been used satisfactorily in experimental cells. Tubes or foil of 3-mil thickness formed by extrusion or rolling are essentially pore-free. Rolled foil can be obtained down to 1-mil thickness in Pd-25Ag which is pore-free.

If the hydrogen diffusion alloy contains significant percentages of palladium (55 to 90 wt percent) at typical costs for palladium of ($50 to $170/troy oz range of prices of metal 1970–1975), economic considerations dictate that the thickness be as small as practical for lowest cost per unit electrode area. For example, the metal cost (excluding fabrication) for Pd-25Ag based on the highest recent cost for palladium ($170/tr oz. June 1974) and having a 3-mil thickness is $4000/kw of output for discharge at 0.75 volt. The cost would be only $10/kw for a thickness of 0.000008 inch. Costs in the range of $10 to $100/kw for both positive and negative electrode metal cost could be economically practical for applications such as off-peak energy storage for electric utilities. Thus, allowable cost (and thickness) for negative electrode depends on metal cost of positive electrode.

As less expensive metal are substituted for palladium and/or silver, the economic thickness of hydrogen diffusion electrode can be increased. The greater the thickness, the greater probability of freedom from porosity. However, other factors in addition to metal cost and freedom from porosity must be considered such as: electrode life (corrosion resistance, resistance to deformation); strength at operational temperature depending on porous backing and differential pressure across the foil thickness [i.e. electrolyte (or oxygen + water vapor pressure) versus hydrogen gas pressure]; hydrogen permeation rate (hydrogen permeation rate and limiting current density are inversely proportional to foil thickness).

The distance between adjacent surfaces of positive and negative electrodes can be 0.02 to 3 centimeters. The distance between adjacent surfaces might cover a wide range depending on the application, objectives, and cell design. For small distances some form of lower limit for oxygen electrode movement would be used, such as an insulator, open-mesh PTFE cloth, insulator with 5-mil threads and a thickness of 9-mils. The minimum electrode distance could be essentially, the separation provided by the insulator. Particularly, for the flat-foil hydrogen electrode, the minimum distance could be defined by the insulator. Assuming an operating range of 35 to 85 percent NaOH electrolyte at 200° C, the density and electrolyte volume can change by a factor of 3.47. Thus, if the oxygen electrode were spaced 0.008 inch from the hydrogen electrode (flat foil) with an electrolyte conventration of 85 percent NaOH, the spacing would be 0.0273 inch with electrolyte diluted to 35 percent. Thus, the relative movement of the oxygen electrode would be only ± 0.0097 inch over the range of 35 to 85 percent NaOH. The advantage of a small interelectrode spacing (electrolyte depth for flat foil) is the small movement of the oxygen electrode. Also, the small spacing minimizes the electrolyte resistance.

On the other hand, for some applications it may be desirable to operate with larger electrode spacing in order to utilize the maximum flexibility of the oxygen electrode. It can be shown that the water storage capacity of the electrolyte between any two concentrations is directly proportional to the maximum movement of the oxygen electrode.

$$Q = 7025 \left[ F_2(\frac{1}{X_2} - 1) - F_1(\frac{1}{X_1} - 1) \right] \frac{\Delta S}{\frac{F_1}{F_2} - 1}$$

where
$Q$ = water storage capacity of electrolyte, ampere-hours/ft$^2$
$X_2$ = highest electrolyte concentration, wt fraction
$X_1$ = lowest electrolyte concentration, wt fraction
$F_2$ = dilution factor at $X_2$, gNaOH/cm$^3$ electrolyte
$F_1$ = dilution factor at $X_1$, gNaOH/cm$^3$ electrolyte
$\Delta S$ = maximum movement of oxygen electrode, inch.

For example, between 85% NaOH ($X_1 = 0.85, F_1 = 1.500$) and 35% NaOH ($X_2 = 0.35, F_2 = 0.432$)

$$Q = 7025 \left[ 0.432 (\frac{1}{0.35} - 1) - 1.500 (\frac{1}{.85} - 1) \right] \frac{\Delta S}{\frac{1.500}{0.432} - 1}$$

$Q = 1528 \, (\Delta S)$ in ampere-hours/ft$^2$.

In the previous example where the minimum spacing was $h = 0.008$ inch, the maximum spacing was $h_2 = 0.0273$ inch and $\Delta S = h_2 - h_1 = 0.0195$ inch.

$Q = 1528(0.0195) = 29.6 \, AH/\text{ft}^2$ (e.g. 0.3 hr at 100 amp/ft$^2$).

Alternately, if $\Delta s = (0.197 - 0.008) = 0.189$ inch $$Q = 1528(0.189) = 288.8 \, AH/ft^2 \text{ (e.g. 2.9 hr at 100 amp.ft}^2\text{)}.$$

However, the minimum spacing is $$h_1 = \frac{\Delta S}{\frac{F_2}{F_1} - 1} = \frac{0.189}{\frac{1.500}{.432} - 1} = 0.076 \text{ inch}$$

and the maximum spacing is $0.076 + 0.189 = 0.265$ inch.

A tubular hydrogen electrode design, compared to flat foil (pan hydrogen electrode), offers a design advantage for increasing the water storage capacity without excessive increase in interelectrode spacing. The water storage capacity is a function of the electrolyte depth from the oxygen electrode to the bottom of the pan. However, tubular electrodes do not have to be located at the bottom of the pan and can be positioned closer to the oxygen electrode to minimize the electrolyte resistance. Thus, the volume of electrolyte below the tubular hydrogen electrodes acts as a reservoir for water.

With large area electrodes (e.g. 3 ft × 3 ft either a floating boat or flexible membrane) it may be possible to obtain a relative movement of ± 0.5 inch or $\Delta S = 1$ inch. Assume that it is desired to operate at 50 ± 5 percent NaOH at 200° C $$Q = 7025 \left[ 0.6040 \left(\frac{1}{0.45} - 1\right) - 0.7980 \left(\frac{1}{.55} - 1\right) \right] \frac{1}{\frac{.7980}{.6040} - 1}$$

$$Q = 1866 \, AH/ft^2 \text{ (e.g. 12 hrs. at 155.6 amp/ft}^2\text{)}$$

$$H_1 = \frac{\Delta S}{\frac{F_2}{F_1} - 1} = \frac{1}{\frac{.792}{.6040} - 1} = \frac{1}{.321} = 3.115 \text{ inch}$$

$$h_2 = 3.115 + 1 = 4.115 \text{ inches}.$$

Using tubular electrodes, the depth of electrolyte to the bottom of the pan, 4.115 inches, but at minimum electrolyte level (55% NaOH) of 3.115 inches, the spacing from the hydrogen diffusion tube (top) to the oxygen electrode is only about 0.008 inch and the maximum interelectrode spacing is 1.008 inch at 45% NaOH. For an electrolyte resistivity of about 0.12 ohm-inch for 45% NaOH at 200° C, the specific resistance of the electrolyte is (1) $(0.12)/144 = 0.0008$ ohm-ft$^2$ at maximum spacing. Thus, the maximum electrolyte voltage drop at 155.6 amp/ft$^2$ is 0.125 volt, (about 0.1 volt more than with 0.2 inch spacing). This is not exorbitant and rather than charge at 1.5 volts and discharge at 0.75 volts, one could charge at 1.6 volt and discharge at 0.8 volt to obtain 50% voltage efficiency.

Thus, for water battery designs in which water is stored in the electrolyte, it would be desirable and feasible to design for large interelectrode spacing up to 1 inch (2.54 cm) or more.

The range of electrolyte concentration that might be used depends on several factors. One advantage of the present invention is that operation over a wide range of electrolyte concentration is feasible. The wider the range of operation the less critical are controls for cell temperature and water vapor with economic advantages in auxilliary equipment. A wide range of concentration would be desirable for water storage in the electrolyte for some applications. It can be shown that for the same maximum movement of the oxygen electrode, there is greater water storage capacity at high electrolyte concentrations than at low electrolyte concentrations. For operation at 200° ± 20° C the maximum concentration might be 75 percent. However, for operation between 220° C and 250° C, it would be possible to use up to 85 percent NaOH without the electrolyte solidifying.

Experimental data has shown that fuel cell mode performance improves as the electrolyte is diluted to the range of 50 to 45 percent NaOH. Possibly better performance would be achieved down to 35 percent NaOH because of increased solubility of oxygen.

The optimum concentration for maximum electrolyte conductivity at 200° to 250° C for NaOH is around 50 percent. Conductivity decreases at higher or lower concentrations. Thus, too dilute electrolyte would have high resistance which could be a factor in some applications.

Dilute electrolytes have a high partial pressure of water vapor for high temperature operation. For example, for 36 percent NaOH, the vapor pressure is about 140 psia at 200° C and about 380 psia at 250° C. Thus, it is not likely that a water battery designed for high temperature operation would use electrolyte more dilute than 35 percent.

Another factor is that as the electrolyte concentration decreases, the surface tension decreases and there is a greater tendency for electrolyte to "weep" through the microporous PTFE. Also, as the electrolyte concentration decreases, there is a greater tendency for hydrogen to spontaneously form bubbles on the Pd-25Ag surface in contact with electrolyte. Thus, 35 percent NaOH is selected as a lower practical limit.

The thin porous and substantially hydrophobic and nonconductive coating on the positive electrode can have a thickness of 0.1 to 400 micrometers comprising essentially polytetrafluoroethylene. Experimental studies were conducted using essentially one type of microporous PTFE for small-scale floating boat cells (0.0002 ft$^2$ area) to large area cells (0.24 ft$^2$ area). The microporous PTFE obtained commercially has a thickness of 0.0015 inch ($\sim$ 40 $\mu$m) and about 80 percent porosity with pore size of about 0.2 $\mu$m. The material has been adequate for experimental study with no indication that it was adversely affecting performance. Thus other thicknesses were not investigated except for thin sprayed coatings. In the evaluation of the large area cells (0.24 ft$^2$), it was found that stresses in the PTFE at cell temperatures of 200° to 220° C were causing localized tears and holes for electrolyte leakage. Consideration was given to the use of a thicker microporous PTFE for added strength. A thicker material would offer greater resistance to diffusion of oxygen and water vapor but probably not adversely affect performance. It was found that preshrinking the microporous PTFE about 10% (by heating to 200° C before bonding to Pt-10Rh screen) improved the subsequent resistance of the membrane to tears and holes. The preheating would have the effect of reducing the porosity (same effect on diffusion as use of a thicker membrane), but no adverse effect on cell performance attributable to the membrane was observed during 300 hours of use at about 200° C.

Thus, it appears that the microporous PTFE can be significantly thicker than 0.0015 inch (possibly to 0.015 inch) and still perform well. Membrane cost is a factor that must be reduced ultimately (e.g. 0.0015 inch material presently costs about \$25/ft$^2$ or ~\$600/kw for experimental cells). At present, the fabrication of microporous sheet is the principal cost rather than the amount of PTFE used (according to thickness). Ultimately, it is visualized that the microporous PTFE coating on one side of platinum alloy screen would be fabricated differently, possibly a sprayed coating of PTFE.

The lower specific limit of 0.1 micrometer (4 microinches) thickness was selected with consideration of a sprayed coating which would ultimately constitute only 20 percent of the platinum alloy screen thickness of 0.5 micrometer (20 microinches). The thinner coating would be advantageous for economic reasons (less PTFE used and less expensive fabrication by spraying) and should allow the maximum diffusion rate of oxygen and water vapor to minimize concentration polarization at high current density and achieve close equilibration of the electrolyte and the water vapor in the oxygen gas.

The thinness of the coating will have to be counterbalanced by life considerations (resistance to electrolyte attack at high temperature and strength). In small-scale experimental work (0.0002 ft$^2$ area cells), thin, sprayed coatings of PTFE on platinum alloy screen were investigated. The screen was floated on water and sprayed with aqueous suspension of PTFE to coat one side only. Excellent fuelcell mode performance ($k=0.25$ amp/ft$^2$ per psia) was obtained relative to other coatings at that stage of experimental work.

The major portion of the positive electrode can have a thickness of 0.5 to 100 micrometers (0.00002 to 0.004 inch). The specific ranges of positive electrode thickness are based on experimental work. Both small-scale (0.0002 ft$^2$) and large-scale (0.24 ft$^2$) cells have used woven Pt-10Rh screen, 80 mesh, 3-mil wire, as received ~ 0.006–0.008 inch thick or after rolling to 0.003 to 0.005 inch thickness. Mostly rolled screen has been used with a typical thickness of 0.004 inch. The technical performance of the thicker screens is adequate and fuel cell mode performance at 50 amp/ft$^2$ has been demonstrated and 100 to 300 amp/ft$^2$ appears attainable at higher oxygen partial pressure. The thicker screen is advantageous because of the better conductivity in a lateral direction with the need for fewer flexible electrical leads to the screen per unit area. The thicker screen would be economically practical if a low cost alloy is developed in the future for use as the positive electrode.

However, the use of a platinum alloy such as Pt-10Rh requires a thinner screen because of cost primarily and also because there is experimental evidence to show that thinner screens can provide better fuel cell mode performance.

An economic goal for the water battery is about \$80/kw for both platinum alloy and Pd-25Ag. Assuming the negative electrode cost can be reduced to \$15/kw, then the positive electrode cost can be \$65/kw. At 300 amp/ft$^2$ and 0.75 volt or 0.225 kw/ft$^2$ output in fuel cell mode, the positive electrode cost can be \$14.62/ft$^2$, at 100 amp/ft$^2$ at 0.75 volt or 0.075 kw/ft$^2$ output in the fuel cell mode, the positive electrode cost can be \$4.87/ft$^2$.

Electroformed platinum screens of 0.00004 inch thickness (\$9.5/ft$^2$) have been made an evaluated in small experimental cells. Results indicate that a current density of 100 amp/ft$^2$ might be attainable. Thus the experimental material is only 2-fold from the cost goal. Thus, a further reduction (2-fold) in electroformed screen thickness to 0.00002 inch is needed.

It would be desirable to use even thinner screen for the positive electrode to reduce cost further so as to allow more of the cost for the negative electrode. It is technically possible to electroform thinner screen (or make by another technique). It is not known whether the technical problems could be solved such as providing current to very thin screen, handling problems, corrosion problems (and life).

At the present time, it is not believed that a practical positive electrode could be made thinner than 0.00002 inch (0.5 $\mu$m).

The average distance between the portion of the surface of the metallic positive electrode contacted by electrolyte and the interface of the electrolyte and the oxygen can be 0.2 to 50 micrometers (0.000008 to 0.002 inch) or roughly half of the thickness of the positive electrode. The exact configuration of the surfaces on a micro scale is not known. However, it is visualized that the electrolyte/oxygen interface between the pores of a screen-type positive electrode might be concave upward with electrolyte penetration of the pore limited by the interface of the hydrophobic PTFE and the metallic screen. The metallic screen might float half-submerged on the surface of the electrolyte. Thus, the maximum distance for oxygen diffusion might be defined by the lowest submerged portion of the screen electrode and the highest interface of electrolyte and PTFE. The average distance (or mean oxygen diffusion distance for fuel cell mode operation) is estimated to be about half the thickness of the positive electrode for electrodes constructed according to the present invention and evaluated in experimental cells. The above visualization and estimate of mean oxygen diffusion correlates with experimental data showing that fuel cell performance increases with decrease in thickness of the positive electrode.

Most applications of the water battery will require long life on the order of 5 to 20 years. In general, the electrode life will be limited by the corrosion resistance of the positive electrode. Although platinum and platinum alloys are among the most corrosion resistant materials for use in aqueous caustic solutions at elevated temperatures, there is a small finite corrosion rate at very high temperatures above 200° C. Since the platinum-group metals are very expensive, very little can be used in the electrodes of an economically viable water battery. Therefore, the positive electrode design must be such that any small corrosion rate does not result in complete dissolution of the electrode or loss of physical integrity within the planned useful life of the water battery. Two principal factors influencing the life of the positive electrode are temperature and surface area ratio (i.e. the ratio of true electrode surface area to projected electrode area on which current density is based). A high operating temperature is desired for the water battery with hydrogen diffusion electrodes for the negative electrode in order to minimize the hydrogen overvoltage and achieve high efficiency. The combination of high temperature and low surface area ratio for the positive electrode is a unique feature of the water battery. Particularly, for fuel cell mode operation, the use of a low surface area ratio for the positive electrode is distinctly different than the historical trend of fuel cell technology. Most fuel cell positive electrodes have been designed to achieve as high surface area ratio as possible to achieve good electrochemical performance at low temperature. However, the use of a large surface area ratio for the positive electrode severely limits the operational temperature (usually below 100° C) in order to minimize electrode corrosion and achieve long life.

The following simple numerical example will illustrate the effect of surface ratio. Assume that the precious metal cost (excluding fabrication) of the positive electrode is to be limited to $60/kw. Further assume that in fuel cell mode operation, the power density is 75 watts/ft$^2$ (e.g. 100 amp/ft$^2$ at 0.75 volt discharge). Thus, the precious metal cost of the electrode has to be about $4.50/ft$^2$ and if the material is platinum at $150/troy ounce, the weight per unit of projected electrode area is 1 mg/cm$^2$. If used in finely divided form (where it is often referred to as a catalyst in conventional fuel cell terminology), the specific surface area might be 10 to 80 square meters per gram. Assuming 10 square meters per gram (typical of the catalyst coating obtained in platinizing), the surface area ratio for a loading of 1 mg/cm$^2$ is 100 cm$^2$ of true surface area per cm$^2$ of projected electrode area. Such a large surface area ratio would result in relatively rapid corrosion and dissolution of the catalyst or electrode at elevated temperatures in caustic electrolyte.

In contrast, with a fine mesh electroformed screen (which is one possible form of positive electrode for the water battery) the surface area ratio is relatively low. For example, a 1000-mesh screen of electroformed platinum with 0.0003-inch wire width and having 50 percent porosity or open area and a thickness of 0.00004-inch also has a specific weight of 1 mg/cm$^2$ and a specific area ratio of only 1.11 (geometric surface area per cm$^2$ of projected areas) neglecting micro-roughness of the surface. In this example, the specific surface area is about 0.01 square meters per gram of platinum. Assuming cell failure when ½ of the original platinum dissolves, the electroformed screen (0.01 m$^2$/g) would last 100 times longer than the finely divided material (10 m$^2$/g); a difference in electrode life of 20 years versus 73 days for example.

In the above example for electroformed screen, the microroughness might double the calculated geometric area so that the true surface area (electrochemical double-layer area) would be about 0.02 square meters per gram. On the other hand, about half the area of electroformed screen is inactive when the screen is bonded to microporous PTFE or a useful area of 0.01 m$^2$/g including roughness and 0.005 m$^2$/g based on geometric area. Thus, the lower specific limit for surface area to weight ratio is about 0.01 m$^2$/g for use at very high temperatures (e.g. 200° C to 250° C). For a more corrosion resistant positive electrode material such as Pt-10Rh rather than pure platinum, and operation at lower temperatures (e.g. 150° C to 200° C) it would be possible to design the electrode for a larger surface area to weight ratio of possible 0.5 square meters per gram. Where it is practical to use a larger surface area to weight ratio, the electrochemical performance of the water battery could be improved because of reduced oxygen overvoltage.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A combination water electrolyzer and fuel cell for selectively storing and supplying energy while in a substantially fixed position comprising
   a pan held in a substantially horizontal position,
   an aqueous electrolyte held within the pan,
   means communicating with a supply of hydrogen and forming a container for the hydrogen within the pan,
   a nonporous hydrogen diffusion negative electrode positioned within the pan, forming at least a portion of the hydrogen container, and having one surface in contact with the electrolyte and an opposite surface communicating with the hydrogen,
   means communicating with a supply of oxygen and furnishing the oxygen to a region contiguous with the exposed surface of the electrolyte,
   a porous positive electrode in contact with the electrolyte and having a thin substantially flat major portion adjacent and substantially parallel to the upper surface of the electrolyte with a substantial portion of the surface of the positive electrode contacted by electrolyte and adjacent an interface of the electrolyte and the oxygen,
   the positive electrode comprising a thin porous conductive member, having on its upper surface a thin porous substantially hydrophobic and nonconductive coating, yieldably supported to permit it to float on the electrolyte with the pores of the electrode at least partly below the upper surface of the electrolyte,
   means for connecting the electrodes selectively either to a source of direct current for charging the cell or to an electric load circuit for using the energy stored in the cell when charged,
   means for storing in a first confined region the supply of hydrogen, including that produced during charging,
   means for storing in a second confined region the supply of oxygen, including that produced during charging,
   means for maintaining the temperature, current density, and electrolyte purity and concentration during charging such that substantially all of the hydrogen gas is formed in the hydrogen container, and
   means, comprising the hydrogen container and means communicating therewith and forming an enclosure around the first confined region, for keeping the hydrogen separated from the oxygen.

2. A cell as in claim 1, comprising also an insulating member fitting onto the upper portion of the cell and shaped to hold another such cell, and at least one additional such cell, each held by the insulating member of the cell beneath it.

3. A cell as in claim 1, comprising also means for maintaining the partial pressure of the oxygen in the second confined region at about 5 to 3000 psia.

4. A cell as in claim 1, comprising also means for maintaining the temperature of the electrolyte at least at about 100° C.

5. A cell as in claim 1, wherein the negative electrode comprises a thin member on a porous support held in a substantially horizontal position to form, with the bottom portion of the pan, the container for the hydrogen within the pan, and with the upper surface of the thin member supporting the electrolyte.

6. A cell as in claim 1, wherein the negative electrode comprises a thin tube immersed in the electrolyte and with the inside of the tube comprising the means communicating with the supply of hydrogen and forming the container for the hydrogen within the pan.

7. A cell as in claim 6, wherein the tube comprises a thin conductive outer layer on a porous tubular support.

8. A cell as in claim 6, wherein the pan has an insulating inner surface that supports the tube.

9. A cell as in claim 1, wherein the surface of the negative electrode in contact with the electrolyte comprises a corrosion resistant alloy consisting essentially of a major amount of palladium and a minor amount of silver.

10. A cell as in claim 9, wherein the alloy consists essentially of about 10 to 45 percent by weight of silver and the balance palladium.

11. A cell as in claim 10, wherein the negative electrode comprises a conductive layer about 0.2 to 80 micrometers thick in contact with the electrolyte on a porous support in contact with the hydrogen.

12. A cell as in claim 1, wherein the distance between the adjacent surfaces of the positive and negative electrodes is about 0.2 to 30 millimeters.

13. A cell as in claim 1, wherein the electrolyte comprises an alkaline solution.

14. A cell as in claim 1, wherein the electrolyte comprises sodium hydroxide.

15. A cell as in claim 1, wherein the electrolyte comprises about 35 to 85 percent sodium hydroxide.

16. A cell as in claim 1, wherein the positive electrode comprises a corrosion resistant material.

17. A cell as in claim 1, wherein the positive electrode comprises platinum or an alloy thereof.

18. A cell as in claim 17, wherein the ratio of surface area to weight of the active surface material of the positive electrode is about 0.02 to 0.5 square meter per gram.

19. A cell as in claim 1, wherein the positive electrode comprises an alloy including platinum and rhodium.

20. A cell as in claim 1, wherein at least part of the yieldable support is provided by springs or other flexible members.

21. A cell as in claim 1, wherein at least part of the yieldable support is provided by the buoyancy of the electrolyte.

22. A cell as in claim 1, wherein the coating comprises a layer about 0.1 to 400 micrometers thick comprising essentially polytetrafluoroethylene.

23. A cell as in claim 1, wherein the major portion of the positive electrode is about 0.5 to 100 micrometers thick.

24. A cell as in claim 1, wherein the average distance between the substantial portion of the surface contacted by electrolyte and the interface of the electrolyte and the oxygen is about 0.2 to 50 micrometers.

25. A cell as in claim 1, wherein the connecting means include a plurality of flexible connectors to the positive electrode.

26. A cell as in claim 1, comprising at least one additional such cell, each held by the insulating member of the cell beneath it, with a plurality of flexible conductive members connecting respective regions on the lower surface of the negative electrode in each additional cell to the regions directly beneath them on the adjacent upper surface of the positive electrode of the cell beneath it.

27. A cell as in claim 1, including a thin flexible portion extending outward from the major portion of the positive electrode and connected to the pan above the upper surface of the electrolyte.

28. A cell as in claim 1, wherein the positive electrode includes an upwardly extending rim along its perimeter.

29. A cell as in claim 1, comprising means for limiting the vertical movement of the positive electrode.

30. A cell as in claim 1, wherein the positive electrode includes a downwardly extending portion shaped to stop any downward movement at a position where the substantially flat lower surface is closely spaced from the nearest surface of the negative electrode.

31. A cell as in claim 30, wherein the downwardly extending portion includes capillary means for maintaining electrical contact between the electrolyte and the major portion of the positive electrode should the level of the upper surface of the electrolyte fall below the position of the major portion of the positive electrode.

* * * * *